United States Patent [19]

Suzuki et al.

[11] Patent Number: 5,650,923
[45] Date of Patent: Jul. 22, 1997

[54] SINGLE PHASE INPUT-THREE PHASE FULL BRIDGE RECTIFIER CIRCUIT AND SINGLE PHASE INPUT-PSEUDO FOUR PHASE FULL BRIDGE RECTIFIER CIRCUIT

[75] Inventors: Yasunobu Suzuki, Tokyo; Toru Teshima, Yokohama, both of Japan

[73] Assignee: I-HITS Laboratory, Yokohama, Japan

[21] Appl. No.: 507,204

[22] Filed: Jul. 26, 1995

[30] Foreign Application Priority Data

Jul. 29, 1994 [JP] Japan .................................. 6-179332
Dec. 29, 1994 [JP] Japan .................................. 6-341197

[51] Int. Cl.$^6$ ................................................ H02M 7/06
[52] U.S. Cl. ................................................ 363/126
[58] Field of Search ........................ 363/37, 39, 44,
363/45, 47, 48, 125, 126, 132

[56] References Cited

U.S. PATENT DOCUMENTS

| 4,723,202 | 2/1988 | Kalman | 363/129 |
| 5,414,613 | 5/1995 | Chen | 363/52 |
| 5,432,695 | 7/1995 | Vlatkovic et al. | 363/138 |
| 5,499,178 | 3/1996 | Mohan | 363/39 |

OTHER PUBLICATIONS

Suzuki et al., "An Approach to the Powerfactor Compensated and Efficiency Improved Rectification", Proceedings of Seventeenth International Telecommunications Energy Conference, Oct. 31, 1995, pp. 436–443.

Primary Examiner—Matthew V. Nguyen
Attorney, Agent, or Firm—Wenderoth, Lind & Ponack

[57] ABSTRACT

A three phase full-bridge rectifier circuit and a pseudo four phase full-bridge rectifier circuit each include a phase conversion circuit for converting an input single phase AC input voltage into a three phase AC voltage or a four phase AC voltage, respectively. The phase conversion circuit includes an inductor and a capacitor and is connected to the inputs of a three phase of four phase full-bridge rectifier circuit.

25 Claims, 30 Drawing Sheets

Fig. 2

| | Circuit | Cost | Efficiency | Power factor | Power Supply Harmonics |
|---|---|---|---|---|---|
| (1) Choke coil input | Choke coil — DC-DC Converter | ◎ | ○ | × | △ |
| (2) One transister Converter | [circuit with PWM Control] | ○ | △ | ○ | △ |
| (3) Active filter | [circuit with PWM Control] — DC-DC Converter | × | △ | ◎ | ○ |

◎ : Excellent   ○ : Good   △ : Reasonable   × : Bad 3 phase bridge (A) Single phase AC circuit (B) Single phase full bridge rectifier circuit (C) Single phase→3 phase conversion (1) Fixed choke coil (L)
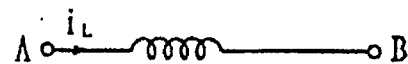
⇩
(2) Partially variable inductance
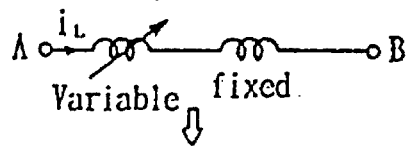
⇩
(3) Partially replaced with controlled reactor
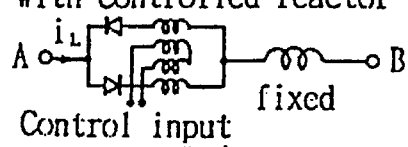
⇩
(4) Triac+fixed inductance
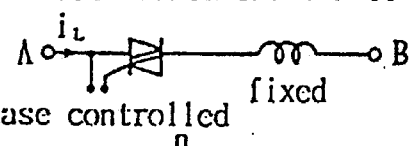
⇩
(5) Thyristor+diode bridge +fixed inductance
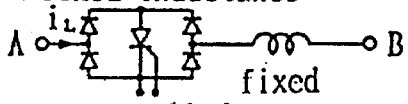
⇩
(6) Transistor+diode bridge +fixed inductance
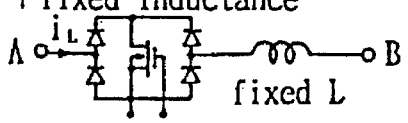
High speed pulse width control load resistance=225Ω  C=14.6μF  L=650mH load resistance 248Ω(+10%), L.C. same condition load resistance 203Ω(-10%), L.C. same condition Fig. 15a    Fig. 15b
| | Circuit | AC (V) | AC (A) | AC (VA) | DC (V) | DC (A) | DC (W) | Pf·η (%) |
|---|---|---|---|---|---|---|---|---|
| Capacitor input type | 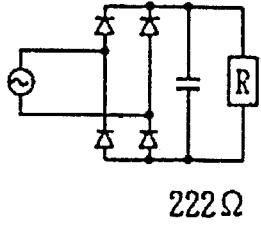 222Ω | 102 | 1.22 | 124.4 | 137 | 0.62 | 85.0 | 68.3 |
| Choke coil input type | 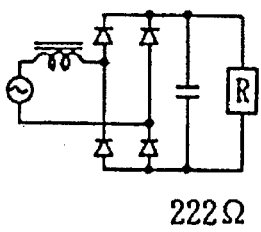 222Ω | 102 | 0.88 | 89.8 | 110 | 0.5 | 55 | 61.2 |
| Single phase full bridge | 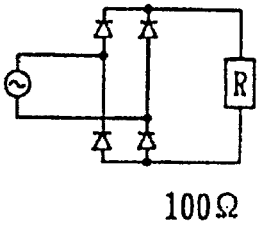 100Ω | 102 | 1.0 | 102 | 90 | 0.90 | 81 | 79.4 |
| Single input 3 phase full bridge | 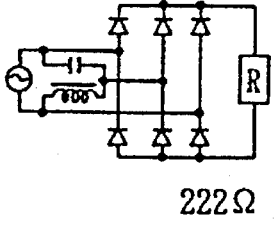 222Ω | 102 | 0.85 | 86.7 | 136 | 0.62 | 84 | 96.9 |
Pf·η = DC(W)/AC(VA)

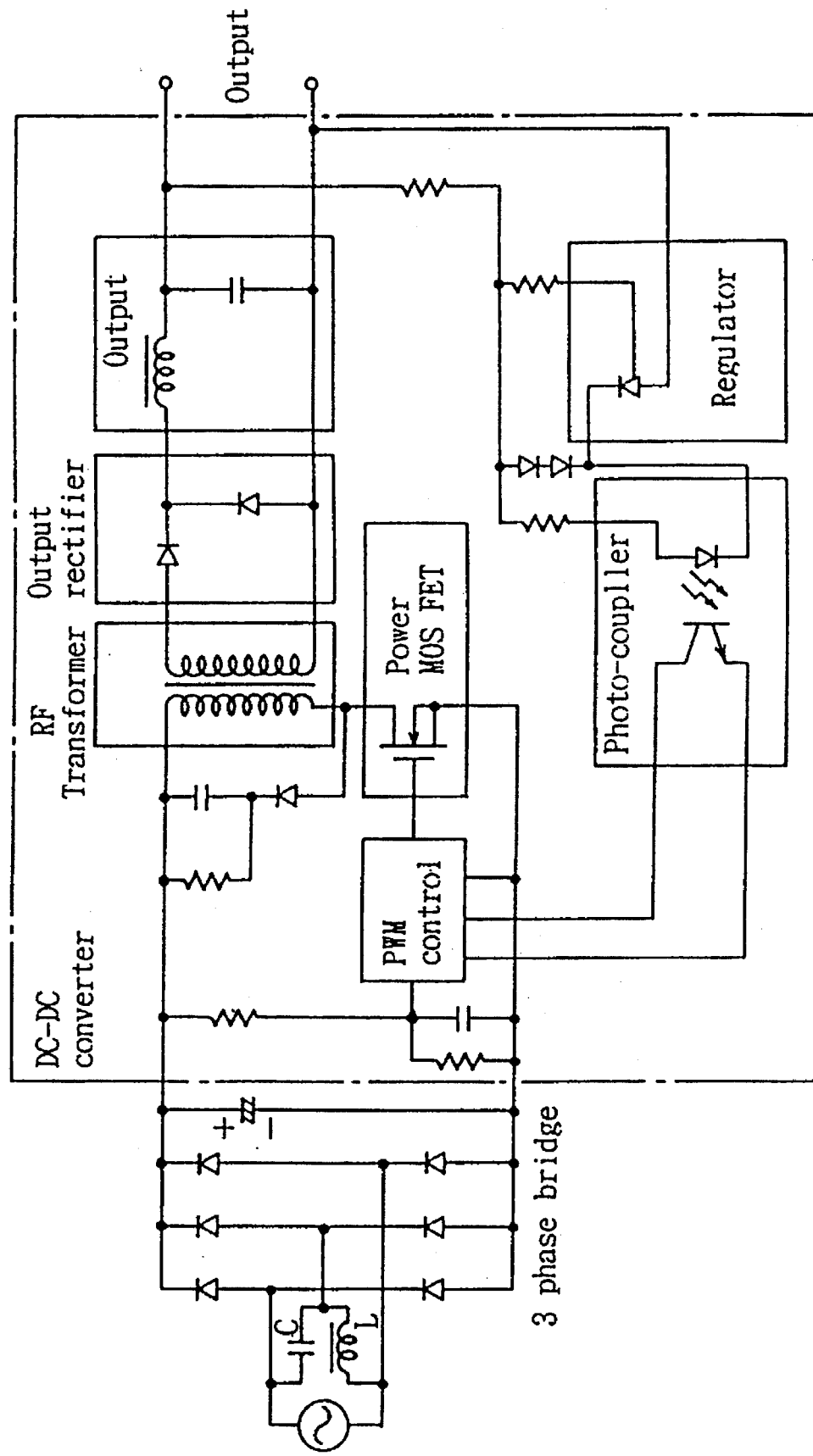
Fig. 16A  (1) Single forward type (2) Push-pull type/Harf bridge type (1) Load non-insulated method (2) Load insulated method (3) SCR chopper type Example of Industrial motor control Example of Uninterruptible power supply Fig. 21 Induction heating type cooking apparatus (1) Load non-insulated method (2) Load insulated DC/DC converter (3) Induction heating type cooking apparatus Example of Industrial motor control the invention relates to a single phase input-three phase full bridge rectifier circuit and a single phase input-pseudo four phase full bridge rectifier circuit.

SINGLE PHASE INPUT-THREE PHASE FULL BRIDGE RECTIFIER CIRCUIT AND SINGLE PHASE INPUT-PSEUDO FOUR PHASE FULL BRIDGE RECTIFIER CIRCUIT

FIELD OF THE INVENTION

The present invention relates to a single phase input-three phase full bridge rectifier circuit and a single phase input-pseudo four phase full bridge rectifier circuit.

To be more precise, the present invention relates to a single phase input-three phase full bridge rectifier circuit and to a single phase input pseudo four phase full bridge rectifier circuit used for videos, audios, all information-communication equipments, electronic equipments such as computers, office automation machines like copy machines, air conditioners, cooking machines, lighting apparatus, industrial motor controllers, or switching power supply for AC output devices like uninterruptible power supply units.

PRIOR ART

Until now, switching power supply is generally used for videos, audios, all information and communication equipments, electronic equipments like computers, office automation machines like copy machines, air conditioners, cooking machines, lighting apparatus, industrial motor controllers, or switching power supply for AC output equipments like uninterruptible power supply Units.

The demand for switching power supply is rapidly increasing as the improved switching for semiconductors or proprietary controller LSI and magnetic materials and condensers are having high frequency characteristics.

However, recently it is pointed out that harmonic current occurred by switching power supply causes electromagnetic interference to commercial power line.

In conjunction with this problem, it is also pointed out that low power factor occurred by switching power supply causes waste of natural energy resource. These problems are now drawing the attention of advanced countries as a common problem.

Nowadays, IEC (International Electrotechnical Commission) decided to regulate harmonic current occurred by switching power supply and low power factor, and the guidelines by Japan are also required.

For example, concerning Regulation No. IEC1DDD-3-2 of IEC Regulations, the object of regulations is derided into 4 classes, Class A for 3 phase input devices, Class B for motor tools, Class C for lighting apparatus and Class D for equipment having specialized/peak current waveforms not exceeding 600 watt. Therefore, Electronic equipments except a kind of air conditioner and almost all AC input equipments are involved in Class D.

An especially important regulation in these regulations on harmonic current is on a single phase capacitor input type rectifier circuit, generally used for switching power supply.

For example, FIG. 1 shows that concerning a single phase capacitor input type rectifier circuit used for TV (230V, 230W) for European market, harmonic current value of all odd order harmonics from third harmonic to 19th harmonic largely exceeds IEC Standard, (solid line in FIG. 1).

Products with such switching power supply are likely to be unable to be sold in future.

Until now, several circuits have been suggested as guidelines against the regulations on harmonic current. Among them, an input choke coil circuit, one transistor converter method (input capacitorless method), and active filter method are generally used.

An input choke coil circuit has a circuit configuration as shown in FIG. 2 (1) for example, and a choke coil is inserted from AC input side. This configuration slightly meets the above-mentioned IEC Standard.

For example, when a choke coil is inserted into the input side of a single phase capacitor input type rectifier circuit used for TV (230V, 230W) for European market as shown in FIG. 3, harmonic current values of all odd order harmonics from third harmonic to 19th harmonic are lower than IEC Standard (solid line in Fig.). However, power factor of an input choke coil circuit is generally 0.75~0.8 as shown in FIG. 4, for example, which meets the lowest value, 0.75, of IEC Standard, but it is not enough. Still there are lots of apparent power.

It is clear that the occurrence of harmonic current in an input choke coil circuit is caused by charging current of a capacitor directly connected with full bridge rectifier output. Accordingly, pulse width modulation (PWM) switching technology excluding a capacitor has been tried.

The type of circuit for pulse width modulation is devided into one transistor converter method and active filter method.

One transistor converter method has a configuration as shown in FIG. 2 (2) for example. Though it has some advantages as to cost, conversion efficiency, power factor, or power line harmonic, but also has a weak point that it is unable to produce output power when AC input voltage instantaneous value is at around 0. Moreover, one transistor converter method has a great weak point that noise at high-speed switching leaks to AC power line side because of lack of a large capacitor at power line side.

Accordingly, switching power supply using one transistor converter method is considerably limited to use.

Whereas, active filter method has a circuit configuration as shown in FIG. 2 (3). This method has close to unity power factor, but needs another switching circuit to improve power factor in addition to switching of a DC-DC converter. This makes the cost increase and makes conversion efficiency decrease by a few percent with the increase of high frequency noise.

Moreover, the above-mentioned input choke coil circuit method has a weak point that a device is limited not to be small and light weight because of a heavy and large choke coil. In case that a circuit is used for a continuously and widely variable load machine like a computer controlled inverter type air conditioner, it is desirable for a circuit to keep the constant voltage under the DC load variations.

As stated above, guidelines against current harmonic limitation and for improvement of power factor in the former switching power supply accompany negative factors such as increase of cost, decrease of conversion efficiency or increase of size and weight.

SUMMARY OF THE INVENTION

The present invention was given under the circumstances and aims to give Single phase input-Three phase full bridge rectifier circuit lower increase of cost and limitation free of power capacity range, and give small and light weight Single phase input-Pseudo four phase full bridge rectifier circuit which keeps the constant voltage under the DC load variations, by overcoming the technical problems and improving radically conversion efficiency, power factor and power line harmonic.

(I) Single phase input-Three phase full bridge rectifier circuit

To solve the above problems, this invention gives Single phase input-Three phase full bridge rectifier circuit having the following characteristic process:

First: Connect one input terminal of a single phase AC input terminal with one terminal of a capacitor, and connect another terminal with one terminal of a choke coil. Make the third terminal by connecting another terminal of a capacitor and another terminal of a choke coil. Connect 2 single phase AC input terminals and the third terminal with the AC input terminal of a 3 phase full bridge.

Second: By fixing the value of the above-mentioned capacitor and choke coil corresponding to the DC load resistance value of a DC output terminal, an equivalent 3 phase rectifier circuit is composed, whereby, 3 phase full bridge rectifier waveform is made.

(II) Single phase input-Pseudo four phase full bridge rectifier circuit.

As the second invention, the present invention gives Single phase input-Pseudo four phase full bridge rectifier circuit having the following characterstic process:

First: One input terminal of single phase AC input terminals is called the first terminal, and another terminal is called the second terminal. Connect the circuit element directly connected with a bidirectional semiconductor switching element, a choke coil and a capacitor between the first terminal and the second terminal. The third terminal is the connection point of a capacitor and a choke coil of this circuit element, and the fourth terminal is the connection point of a choke coil and a bidirectional semiconductor switching element. Connect these four input terminals with four AC input terminals of 4 phase full bridge rectifier circuit, and connect DC load with plus and minus DC output terminals.

Second: By changing the phase angle or on-off ratio of the above bidirectional semiconductor switching element depending on the value of DC output voltage or DC output current, DC output voltage or DC output current is adjusted.

BRIEF DESCRIPTION OF THE DRAWINGS

FIG. 2 shows a circuit configurations having the typical harmonic reduction method.

FIGS. 15a and 15b show testing values of the conventional circuits and the Invented Single phase input-Three phase full bridge rectifier circuit.

DETAILED DESCRIPTION OF THE INVENTION (I) Single phase input-Three phase full bridge rectifier circuit FIG. 5 shows one status of Single phase input-Three phase full bridge rectifier circuit. Excellent operation efficiency such as high conversion efficiency or high power factor is given by using this circuit.

Then, I hereby compare conversion efficiency of the invented Single phase input-Three phase full bridge rectifier circuit and the conventional single phase full bridge rectifier circuit basing upon the actual calculation.

To compare with the invented Single phase input-Three phase full bridge rectifier circuit, a single phase AC circuit (FIG. 6), a single phase full bridge rectifier circuit (FIG. 7) and a single to 3 phase conversion circuit (FIG. 8) are shown for example.

Figure 6:
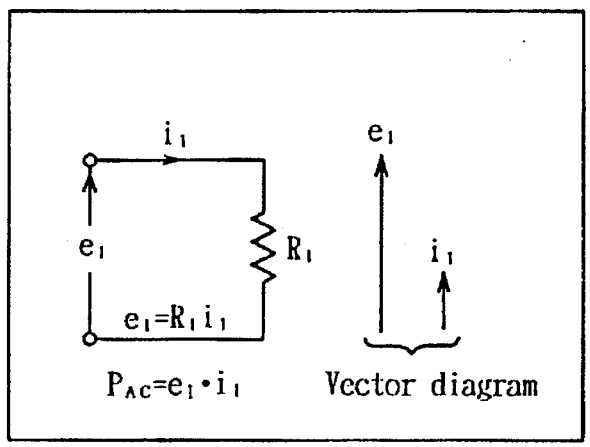
FIG. 6 shows a configuration of single phase AC circuit.
Figure 7:
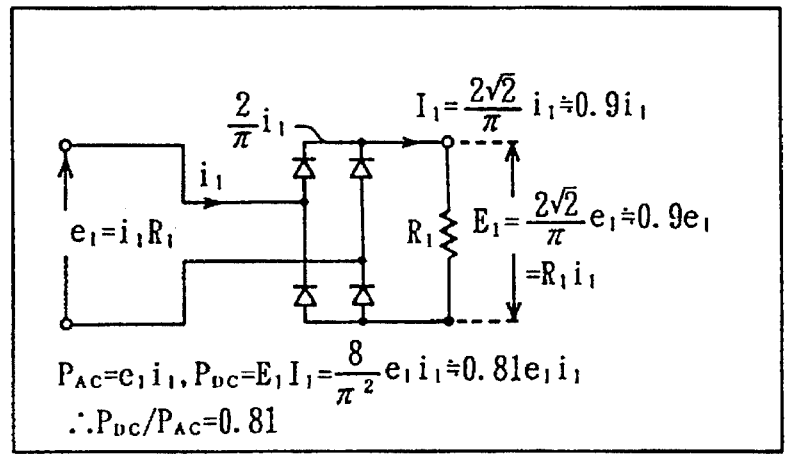
FIG. 7 shows a configuration of single phase Full bridge DC circuit.

Voltage, current and power of each circuit are defined as follows:

In the single phase AC circuit in FIG. 6, $e_1$ is: AC input voltage $i_1$ is: AC input current $P_{AC}$ is: AC input power When the same AC input voltage ($e_1$), AC input current ($i_1$) and AC input power ($P_{AC}$) as of FIG. 6 are used for a single phase full bridge rectifier circuit (FIG. 7), DC output voltage ($E_1$), DC output current ($I_1$) and DC output power ($P_{DC}$) are as shown in FIG. 7.

As a result, it is clear that theoretically, DC output power ($P_{DC}$) does not exceed 81% of AC input power($P_{AC}$). This means that energy of harmonic component involved in single phase full bridge output wave forms is 19% and is not used as DC output power.

Figure 8:
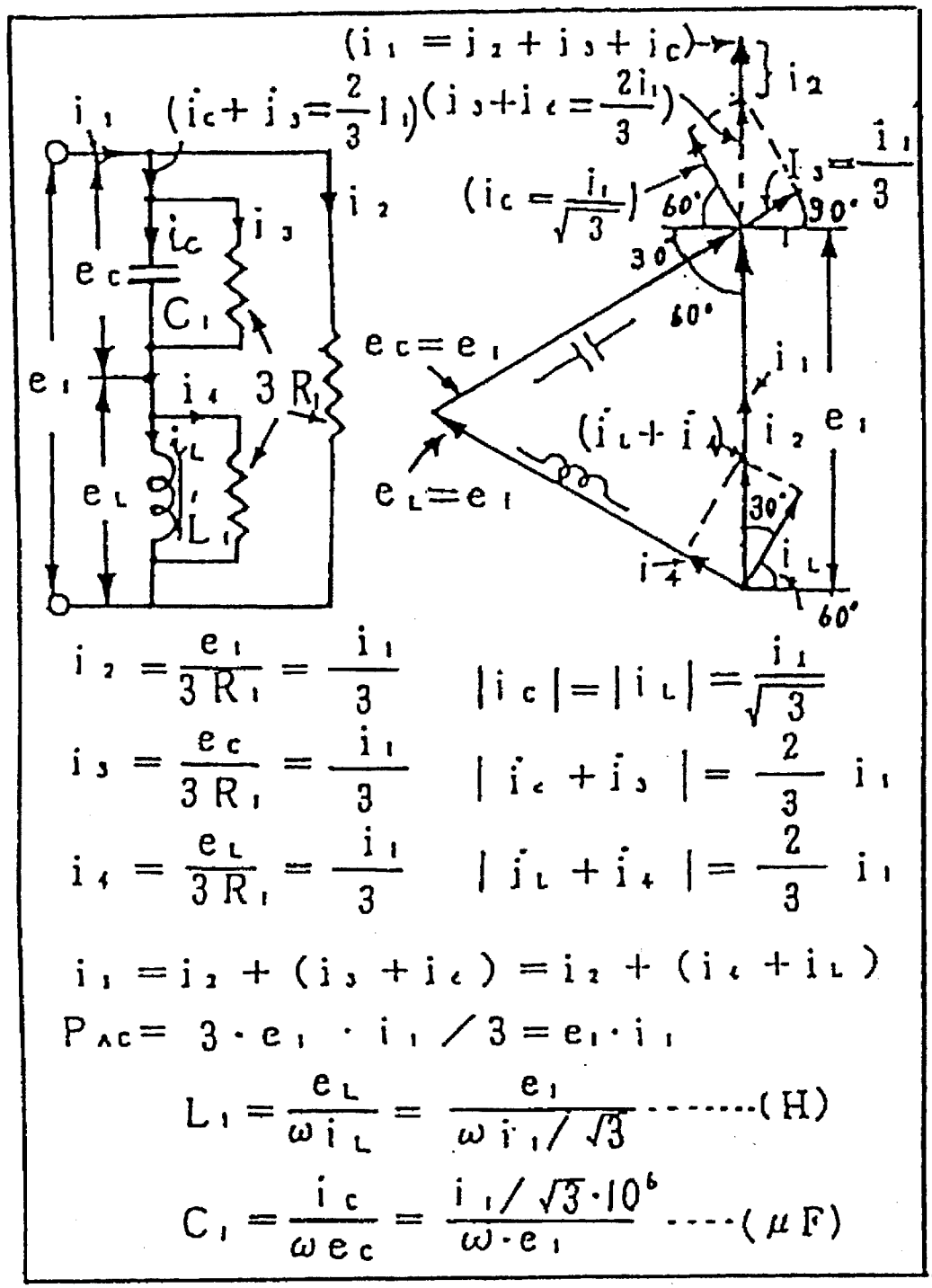
FIG. 8 shows a configuration of conversion circuit from single phase to 3 phase.

Next is about a single to 3 phase conversion circuit shown in FIG. 8 taking account of a single phase AC circuit and a single phase full bridge rectifier circuit.

This single to 3 phase conversion circuit is a circuit to produce different phase voltage from the vector of AC input voltage ($e_1$) at the connection point of $C_1$ and $L_1$ by connecting a series circuit of a capacitor ($C_1$) and a choke coil ($L_1$) between two AC input terminals (1) and (2) as shown in FIG. 8.

In this single to 3 phase conversion circuit, to equalize the sum of 3 phase load power with single phase power $e_1$, $i_1$ of a single phase AC circuit under the condition that AC input voltage ($e_1$) and AC input current ($i_1$) is same as the single phase AC circuit and the single phase full bridge rectifier circuit shown in FIG. 6 and FIG. 7, the equation is as follows when i2, $i_3$ and i4 of FIG. 8 is $i_1/3$.

$$\left. \begin{array}{l} 3 \text{ phase} \times \frac{i_1}{3} \times e_1 = i_1 \cdot e_1 \\ \text{Whereby,} \quad 3e_1/i_1 = 3R_1 \end{array} \right\} \quad (1)$$

Load resistance per phase = $3e_1/i_1 = 3R_1$

At first, the value of a capacitor ($C_1$) and a choke coil ($L_1$) of this single to 3 phase conversion circuit is fixed to produce 3 phase AC.

When AC voltage vector diagram of triangle is shown as per FIG. 8, voltage vector of $L_1$ and $C_1$ is $e_L$ and $e_C$. At this time, current vector of $i_S$ has the same phase as $e_C$ because of resistive, and current of $i_C$ advances 90° from vector of $e_C$ because of capacitive due to AC theory.

When absolute value is fixed as:

√3 times of absolute value of is That is; √3 $i_S$ Equation (2) is:

$$|i_c + i_3| = \sqrt{(\sqrt{3}\ i_3)^2 + i_3^2} = 2i_3 = \frac{2}{3} i_1 \quad (2)$$

In the same way, when absolute value of $i_L$ is fixed as below:

√3 times of absolute value (|i$_1$/3|) of i$_4$ Equation (3) is:

$$|i_L + i_4| = \sqrt{(\sqrt{3}\ i_4)^2 + i_4^2} = 2i_4 = \frac{2}{3} i_1 \quad (3)$$

It is clear from the vector diagram, that parallel composite current ($2i_1/3$) of $C_1$ and $3R_1$ and parallel composite current ($2i_1/3$) of $L_1$ and $3R_1$ have the same phase as single phase AC input voltage ($e_1$), or power factor 1.

Then, equivalent 3 phase AC circuit can be composed.

Moreover, the current vector of $i_2$ is only made of resistant component and has the same phase as single AC input voltage ($e_1$). Single phase AC input current ($i_1$) is shown as the following equation (4) by arithmetically adding $C_1$ and $3R_1$ to component current $i_2$, or $L_1$ and $3R_1$ to the component current $i_2$:

Equation (4)is;

$$i_1 = i_2 + (i_3 + i_c) = i_2 + (i_4 + i_L) = \frac{i_1}{3} + \frac{2 i_1}{3} \quad (4)$$

As AC input power is $e_1 \cdot i_1$ and AC output power is 3 phase $\cdot e_1 \cdot i_1/3 = e_1 i_1$, same power consumption as $P_{AC} = e_1 i_1$ of a single phase AC circuit is realized by a 3 phase circuit.

Next is to fix the voltage and the current of each part of the invented Single phase input-Three phase full bridge rectifier circuit.

When the condition is same as the single phase full bridge rectifier circuit of the above FIG. 7, DC output voltage ($E_3$), DC output current ($I_3$), equivalent output load resistance ($R_3$), AC current running through one arm of diode ($i_5$), 3 phase bridge AC input current ($i_6$), AC input current ($i_7$), choke coil current ($i_8$), capacitor current ($i_9$), AC input power ($P_{AC}$) and DC output power ($P_{DC}$) are shown as the following equation (5):

$$E_3 = \frac{3\sqrt{2}}{\pi} e_1 = \left(\frac{3}{2}\right)\left(\frac{2\sqrt{2}}{\pi} e_1\right) = \frac{3}{2} E_1 \approx 1.35 e_1 \quad (5)$$

$$I_3 = \frac{E_1 I_1}{E_3} = \frac{2}{3} I_1 = \left(\frac{2}{3}\right)\left(\frac{2\sqrt{2}}{\pi} i_1\right) = \frac{4\sqrt{2}}{3\pi} i_1 = 0.6 i_1$$

$$R_3 = \frac{E_3}{I_3} = \left(\frac{3}{2}\right) E_1 / \left(\frac{2}{3}\right) I_1 = \left(\frac{3}{2}\right)^2 \frac{E_1}{I_1} = 2.25 R_1$$

$$i_5 = \frac{I_3}{\sqrt{3}} = \frac{2}{3\sqrt{3}} I_1 = \frac{4\sqrt{2}}{3\sqrt{3}\ \pi} i_1 \approx 0.346 i_1$$

$$i_6 = \sqrt{2}\ i_5 = \sqrt{\frac{2}{3}}\ I_3 = \frac{8}{3\sqrt{3}\ \pi} i_1 \approx 0.49 i_1$$

$$i_7 = \sqrt{3}\ i_6 = \frac{8}{3\pi} i_1 \approx 0.85 i_1$$

$$i_8 = i_9 = \frac{i_7}{\sqrt{3}} = i_6 \approx 0.49 i_1$$

$$P_{AC} = e_1 \cdot i_7 = e_1 \cdot 0.85 i_1 = 0.85 e_1 i_1$$

$$P_{DC} = E_3 I_3 = \left(\frac{3\sqrt{2}}{\pi} e_1\right)\left(\frac{4\sqrt{2}}{3\pi} i_1\right) = \frac{8 e_1 i_1}{\pi^2} = 0.81 e_1 i_1$$

That is, while the former single phase full bridge rectifier circuit needs $e_1 \cdot i_1$ of AC input power to get DC output power $0.81 \cdot e_1 \cdot i_1$ the invented Single phase input-Three phase full bridge rectifier circuit can give equivalent DC output to AC input power $0.85 \cdot e_1 \cdot i_1$.

This means 15% reduction of power consumption from the former single phase full bridge rectifier circuit and approx. 100% power factor is maintained. And it also has an advantage that harmonic component leaked to AC input power line side is sufficiently reduced.

Fundamental reasons for these advantages are because of feasibility of DC conversion with little harmonic component and feasibility of equivalent conversion efficiency to a 3 phase AC circuit by using 3 phase full bridge rectifier.

This means that when the invented Single phase input-Three phase full bridge rectifier circuit is used for the power supply of single phase electric apparatus having constant load such as the present TV, personal computers or video tape recorders, approx. 15% reduction of single phase AC power energy resource on global basis without harmonic interference to power lines is possible.

Moreover, under the operation principle of the above-mentioned FIG. 8, apparatus for 3 phase is able to operate with equivalent conversion efficiency even by using a single phase circuit.

The invented Single phase input-Three phase full bridge rectifier circuit needs one additional AC capacitor, one choke coil and 2 elements of rectifier diode. The capacity of a choke coil ($L_2$) which is a main element of high cost is shown as $0.49 \cdot e_1 \cdot i_i$ (VA) in equation (5) and below-mentioned equation (7), which is equivalent to $\frac{1}{2} = 0.25 \cdot e_1 \cdot i_1$ of equivalent capacity of transformers, or equivalent to $\frac{1}{4}$ of the capacity of single phase full bridge insulated transformers.

The AC capacitor ($C_2$) of this invention is 15 μF, 100 WV when DC output power is about 80 W, which is not expensive like 2 elements of diode.

If the choke coil and smoothing electrolytic capacitor of the conventional type shown in the above FIG. 2, cost same as $C_2$ and $L_2$ of the invented circuit, the invented circuit needs only 2 additional elements of rectifier diode to the choke coil inserted circuit, the cost of which is between one transistor converter type and choke coil input type shown in the above FIG. 2.

(II) Single phase input-Pseudo four phase full bridge rectifier circuit

Figures 1A, 1B:
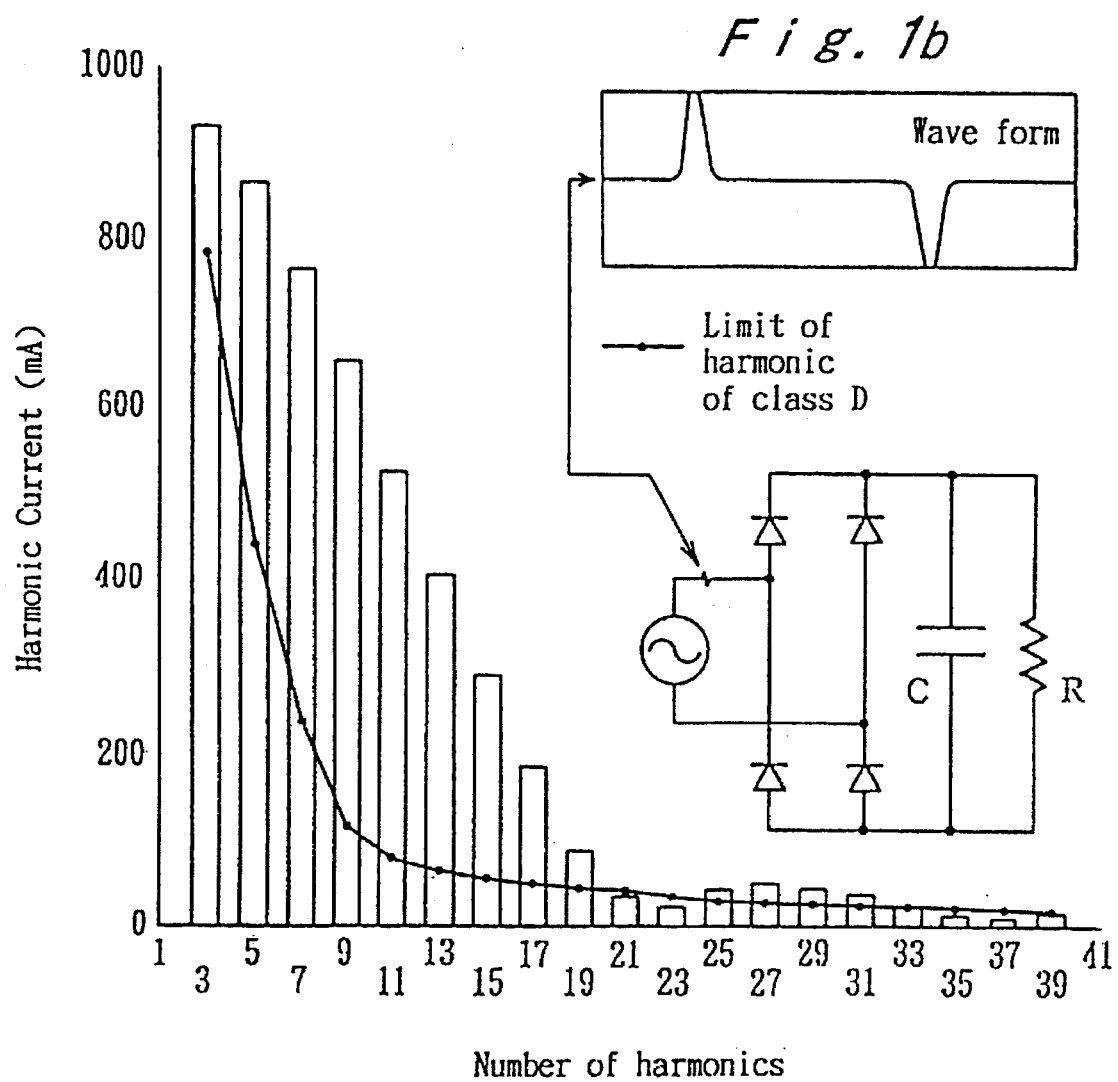
FIGS. 1a and 1b shows a relation between number and value of harmonic current of the conventional input capacitor type circuit.
Figures 3A, 3B:
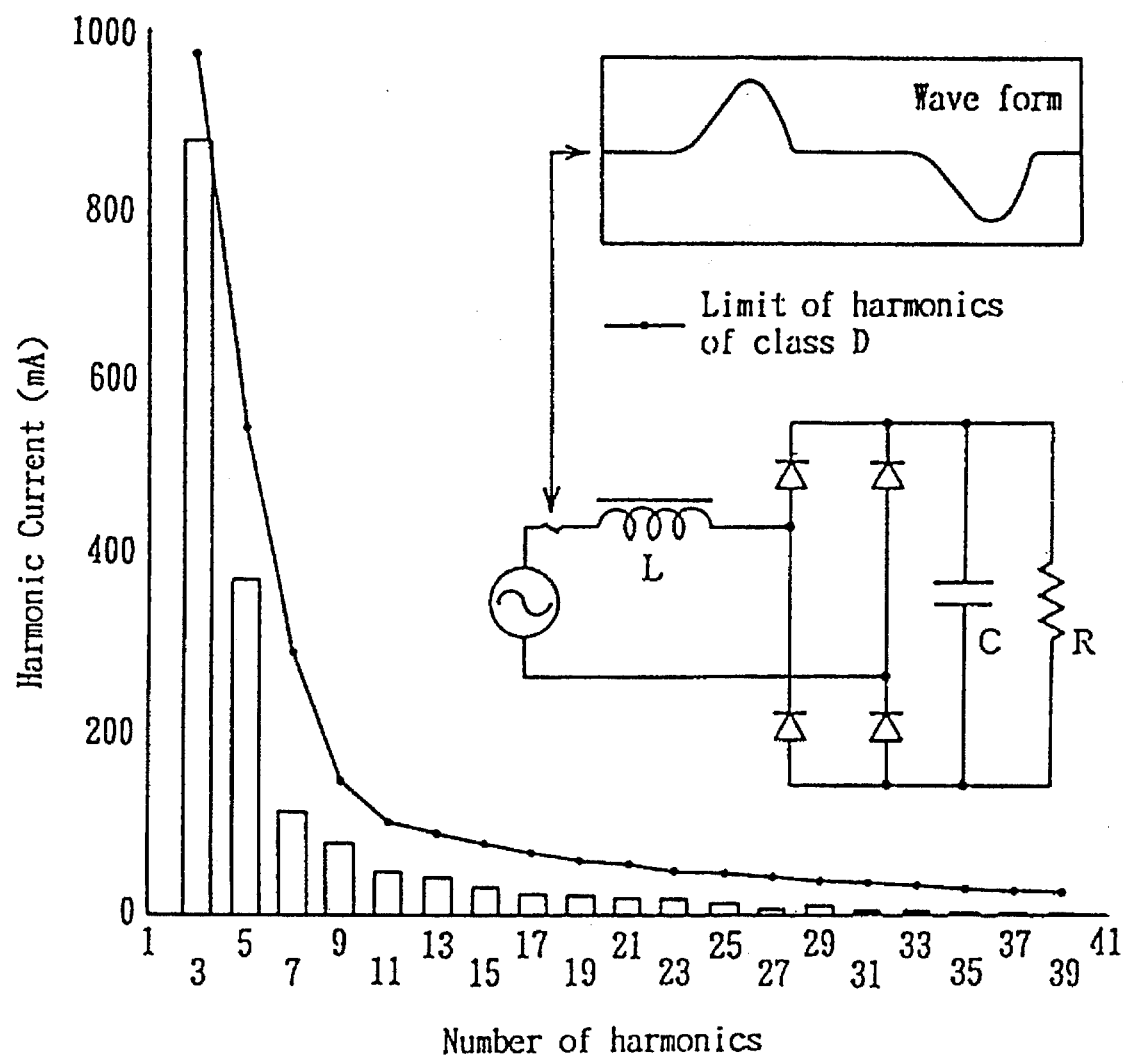
FIGS. 3a and 3b shows a relation between number and value of harmonic current of the conventional input choke coil type circuit.
Figure 4:
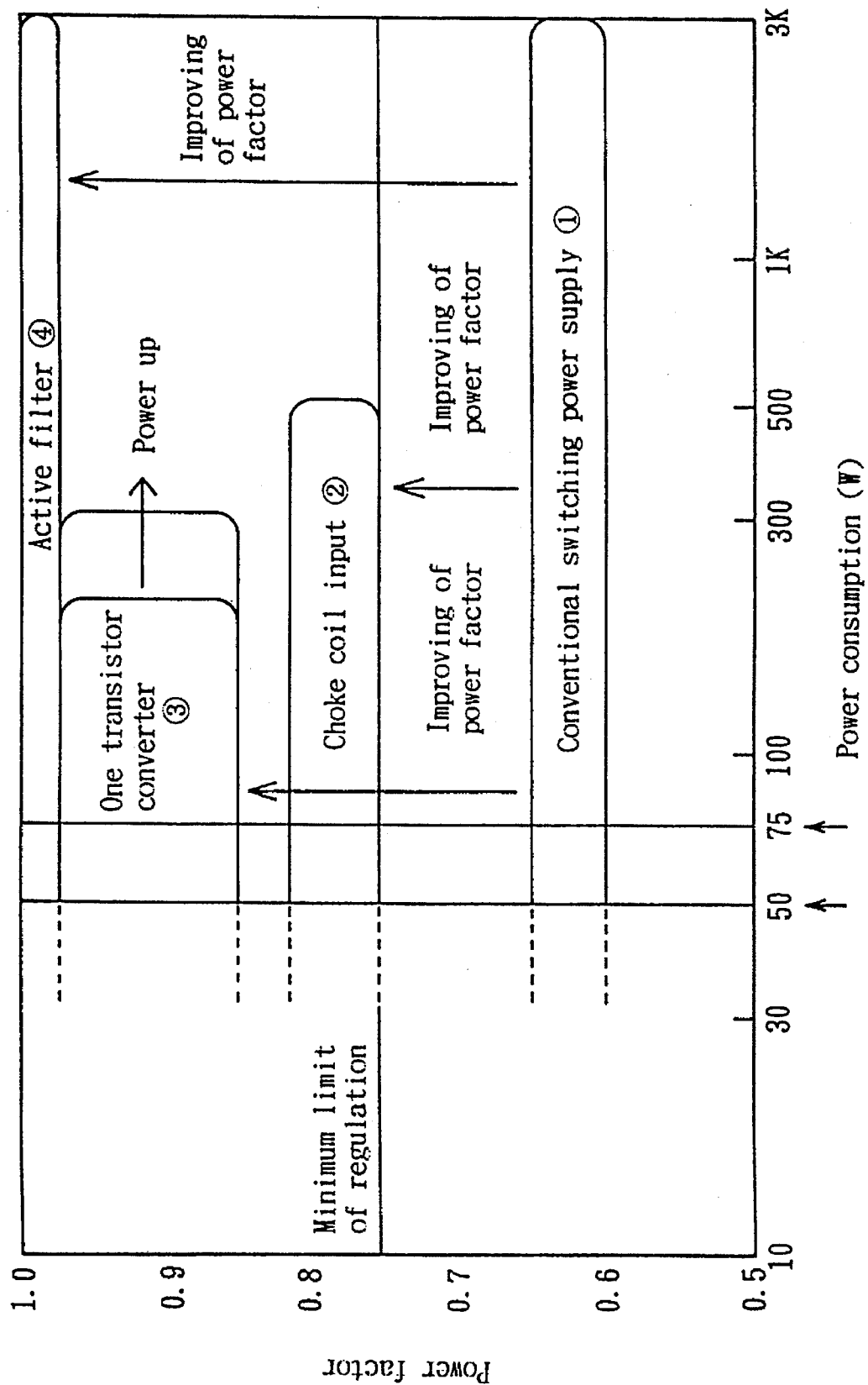
FIG. 4 shows a relation between power consumption and power factor of the conventional circuit.
Figure 5:
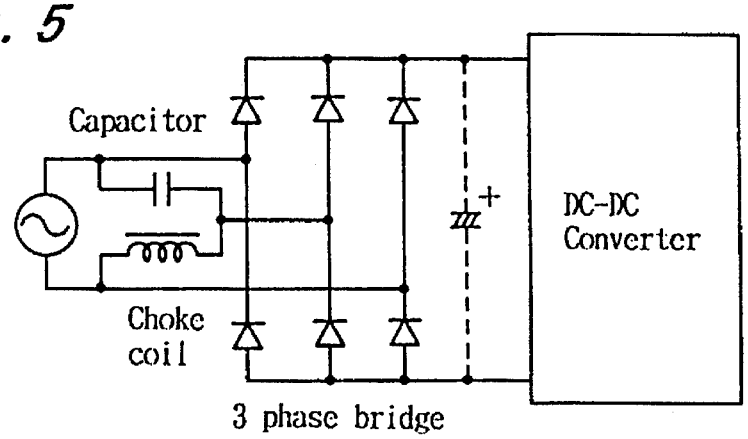
FIG. 5 shows a circuit configuration showing the invented Single phase input-Three phase full bridge rectifier circuit.
Figure 9A:
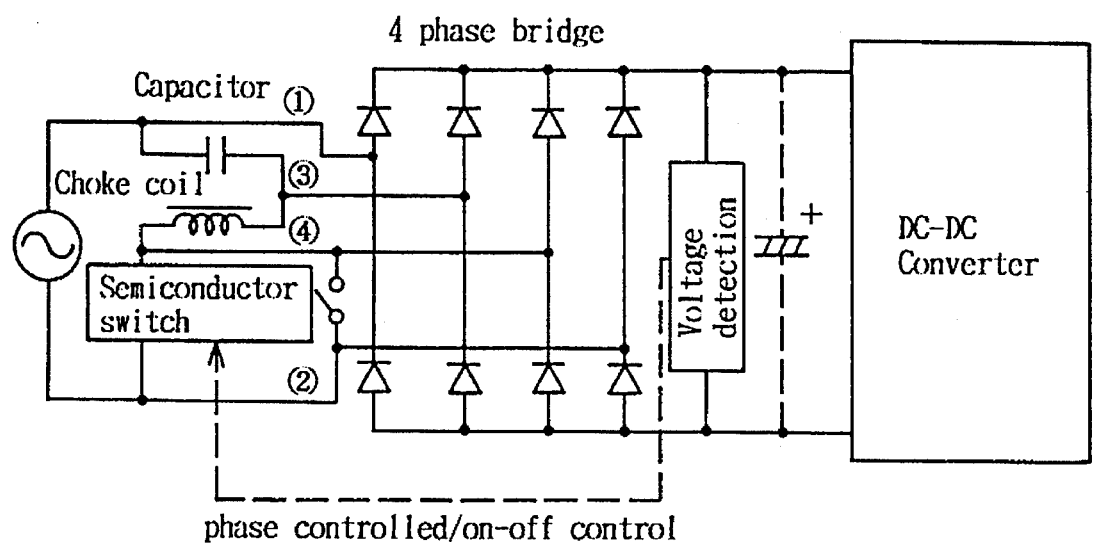
FIG. 9 (A)(B) show circuit configurations showing each the invented Single phase input-Pseudo four phase full bridge rectifier circuit.
Figure 9B:
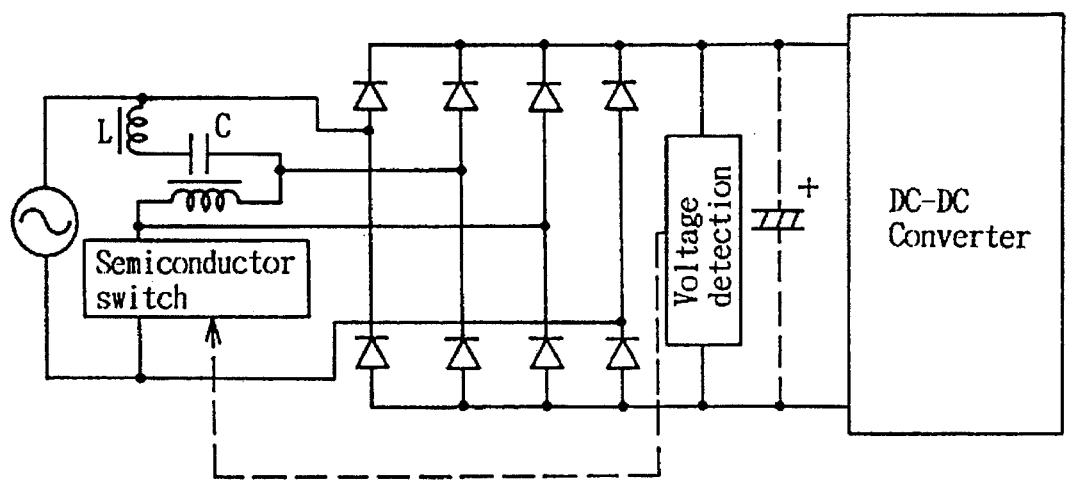

The resultant impedance made with a bidirectional semiconductor switching element and a choke coil of FIG. 9 is equivalent to the impedance of a choke coil of Single phase input-Three phase full bridge rectifier circuit of FIG. 5. This circuit is able to keep constant voltage control against load variation as resultant inductance in a choke coil is changeable by using a bidirectional semiconductor switching element. The circuit of FIG. 10 has same operation principle and capacity as the circuit of FIG. 9.

Figure 13A:
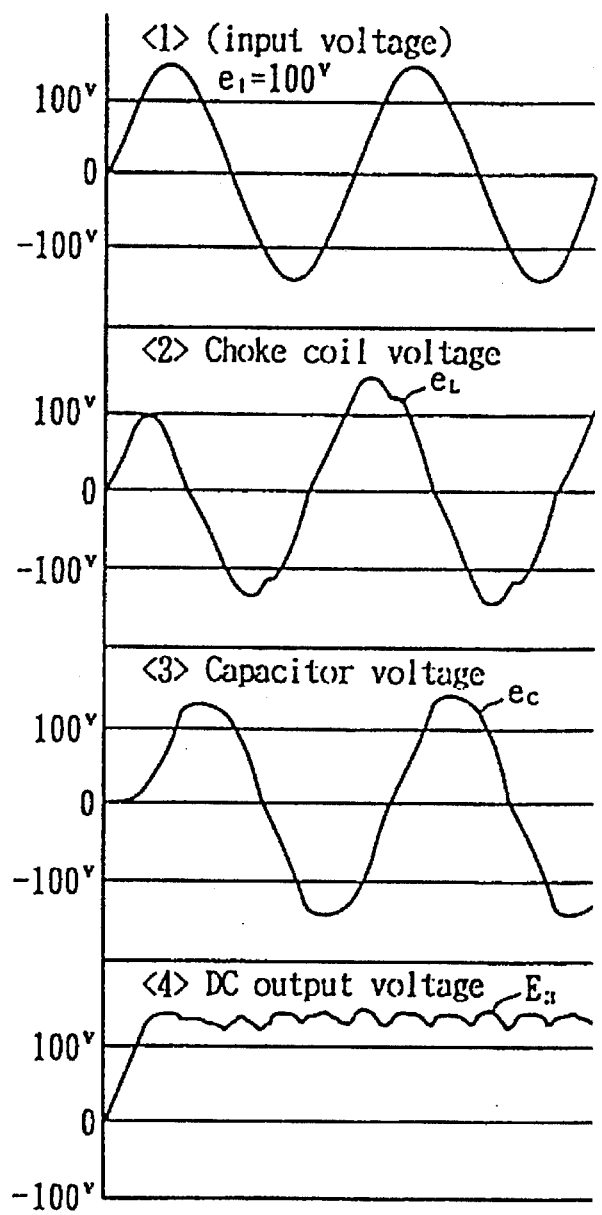
FIGS. 13a and 13b show voltage and current wave forms of the invented Single phase input-Three phase full bridge rectifier circuit.
Figure 13B:
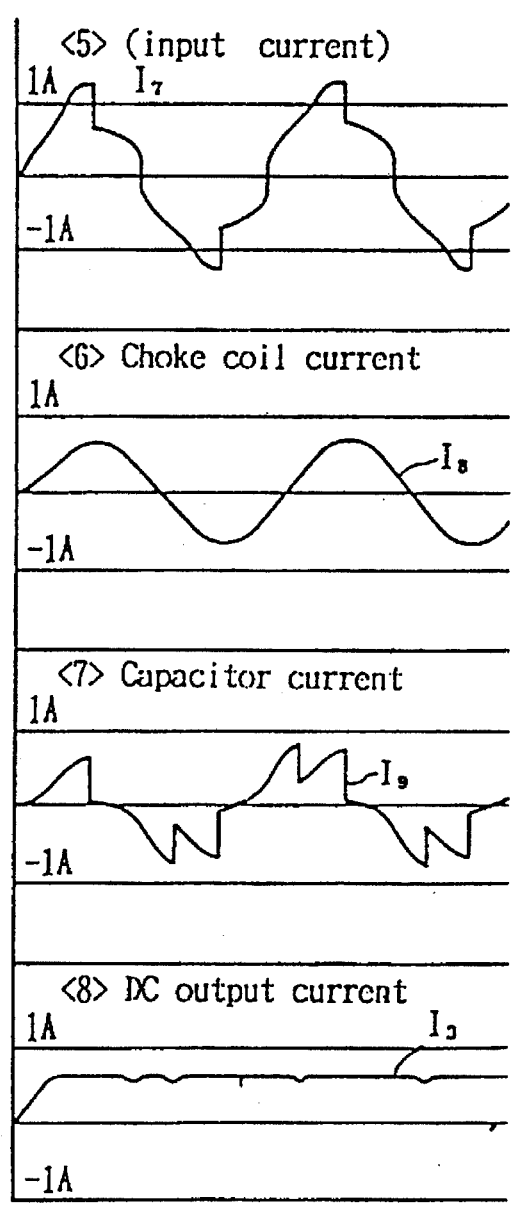

FIG. 9 (A)(B) show examples 5 circuit configuration of the invented single phase input-Pseudo four phase full bridge rectifier circuits. FIG. 9 (A) is indicated for principle circuit, FIG. 9 (8) is also indicated for practical application.

Where small choke coil is inserted with capacitor C, which acts as smoothing capacitor current indicated in FIG. 13. There fore, AC input current harmonic component is sufficently reduced.

Figure 10:
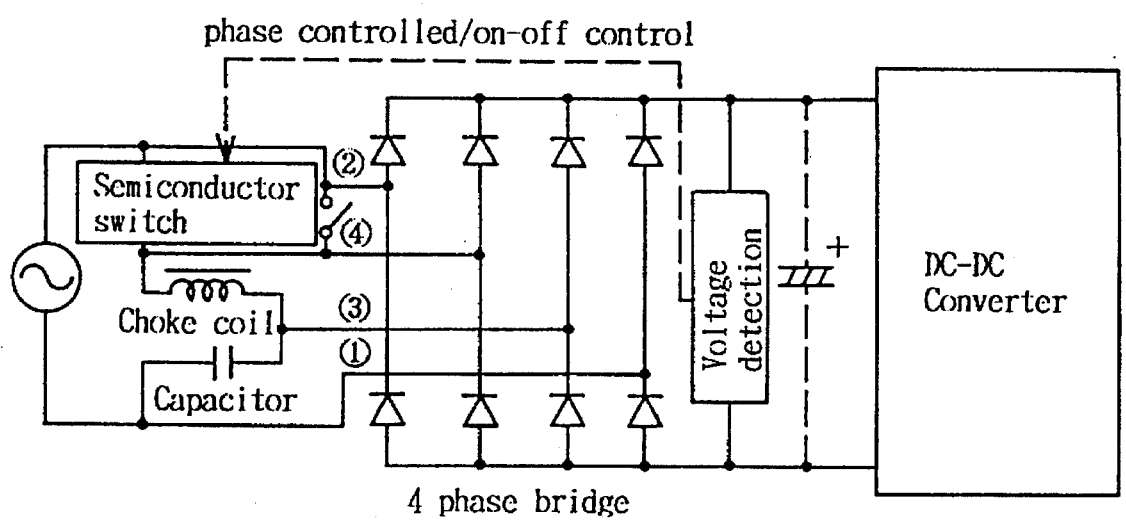
FIG. 10 shows an another circuit configuration showing the invented Single phase input-Pseudo four phase full bridge rectifier circuit.
Figure 11A:
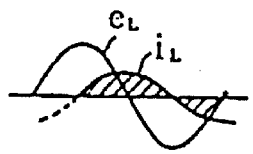
FIGS. 11a–11f show circuit configurations and wave forms of fixed to variable inductance choke coil part.
Figure 11B:
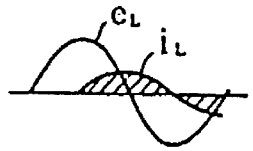
Figure 11C:
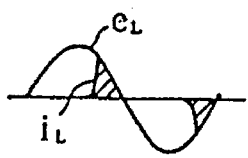
Figure 11D:
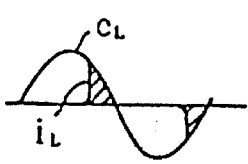
Figure 11E:
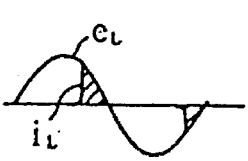
Figure 11F:
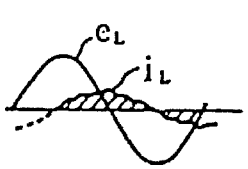

FIG. 10 show examples circuit configuration of Single phase input-Pseudo four phase full bridge rectifier circuit, where the order of connection among a bidirectional semiconductor switching element, a choke coil and a capacitor of the circuit of FIG. 9 (A)(B) are replaced.

The resultant impedance made with a bidirectional semiconductor switching element and a choke coil of FIG. 9 (A)(B) is equivalent to the impedance of a choke coil of Single phase input-Three phase full bridge rectifier circuit of FIG. 5.

This circuit is able to keep constant voltage control against load variation as resultant inductance in a choke coil is changeable by using a bidirectional semiconductor switching element. The circuit of FIG. 10 has same operation principle and capacity as the circuit of FIG. 9.

FIG. 11 shows an example circuit configuration of a choke coil part. FIG. 11 (1) shows the existing circuit configuration with a choke coil where inductance is fixed. FIG. 11 (2) shows an example circuit configuration having variable inductance. In this circuit, some inductance is fixed and other inductance is variable.

The constant voltage or constant current is automatically controlled by using a bidirectional semiconductor switching element for this variable inductance.

There are the following circuits which have variable inductance:

1) A circuit having a saturable reactor as a control device for variable inductance
2) A circuit having a phase controlled thyristor and a diode bridge
3) A circuit having a transistor and a diode bridge
4) A circuit having a triac FIG. 11 (3) shows an example configuration of the circuit having a saturable reactor. Though this circuit is smoothly and excellently able to control constant voltage, it is not useful at present because of its big size and weight, and high production cost.

FIG. 11 (5) shows an example configuration of the circuit having a phase controlled thyristor and a diode bridge. This circuit has an equivalent control efficiency to the above-mentioned circuit with a saturable reactor, but also has weak points such as high heating and degradation of efficiency because of voltage drop in semiconductor when switching ON amounting to 2.5~3V (1V at a phase controlled thyristor, 1.5~2V at a diode bridge).

FIG. 11 (6) shows an example configuration of the circuit having a transistor and a diode bridge. This circuit is a high speed pulse with control circuit, which is more smoothly able to control constant voltage by narrowing pulse with against the increase of load resistance, or the decrease of load current. However, it has the same weak point as one transistor converter type and active filter type such as high frequency electro magnetic wave interference by high speed switching.

FIG. 11 (4) shows an example configuration of a circuit having a triac. This circuit has equivalent control efficiency to a circuit with a saturable reactor, but has not weak points like the above-mentioned circuits. The current running through this circuit is extremely little when the phase angle of a triac is close to lad degree. Not only its equivalent inductance is large, but also it has pulsive current whose phase is delayed 90 degree on average from the phase of input voltage.

The capacity of fixed inductance of this circuit can be reduced to $\frac{1}{3}$~$\frac{1}{5}$ of the capacity of the original inductance of the circuit shown in FIG. 11 (1), that is, the capacity of inductance in a choke coil used by the existing circuit. Conseqently, it is clear that the circuit having a triac is the most suitable for a bidirectional semiconductor switching element to control variable inductance.

Accordingly, the invented Single phase input-Pseudo four phase full bridge rectifier circuit uses variable inductance which consists of bidirectional semiconductor phase controlled element and a fixed part of choke coil capacity makes small and light weight. Moreover, more smooth and excellent automatic constant voltage control can be given by using a triac as a bidirectional semiconductor phase controlled element.

Basing on the above configuration and characteristics, the invented Single phase input-Three phase full bridge rectifier circuit and Single phase input-Pseudo four phase full bridge rectifier circuit can constitute a single phase input 3 phase full bridge rectifier circuit or a 4 phase full bridge rectifier circuit which can realize the characteristics of unbalanced 3 phase AC full bridge rectifier having an inferior wave form to a full bridge rectified wave form of normal 3 phase AC input by connected with a choke coil, a capacitor and 3 phase full bridge rectifier elements or 4 phase full bridge elements, whose value is away from the best value depending on load of output terminals.

They also can constitute a single phase input 3 phase full bridge rectifier circuit or a single phase input 4 phase full bridge rectifier circuit having a mechanism to cut off the above invented capacitor or choke coil circuit corresponding to shutting down the main load circuits without partial function circuit, when an electronic apparatus as DC main load is idle condition.

More detailed explanation for this invention is given below by showing working examples.

EXAMPLE 1

Figure 12:
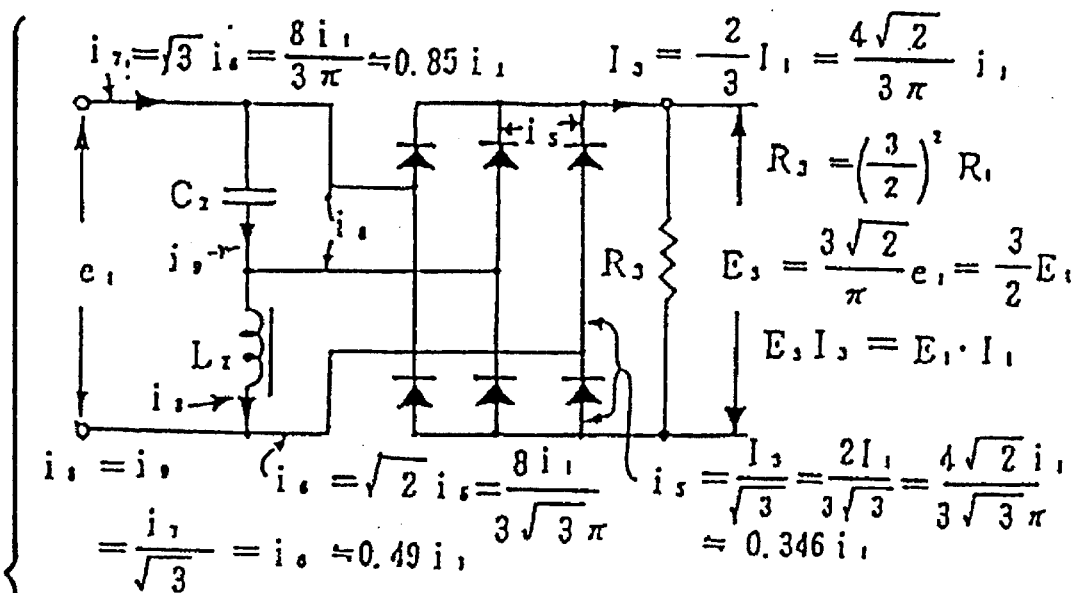
FIG. 12 shows a circuit configuration showing the invented Single phase input-Three phase full bridge rectifier circuit.

The invented Single phase input-Three phase full bridge rectifier circuit shown in FIG. 12 is confirmed by computer simulation and experiment to demonstrate the operation of the invented Single phase input-Three phase full bridge rectifier circuit.

At first, the value of $L_2$, $C_2$ and $3R_3$ is fixed depending on $i_8$ and $i_9$ of the above equation (5). For comparison, voltage, current and power of a single phase full bridge rectifier circuit is hypothetically assumed as the following equation (6):

$$\text{AC Side} \begin{pmatrix} e_1 & = & 100 \text{ V} \\ i_1 & = & 1 \text{ A} \\ P_{AC} & = & 100 \text{ W} \\ R & = & 100 \text{ }\Omega \end{pmatrix} \text{DC Side} \begin{pmatrix} E_1 & = & 90 \text{ V} \\ I_1 & = & 0.9 \text{ A} \\ P_{DC} & = & 81 \text{ W} \\ R_1 & = & 100 \text{ }\Omega \end{pmatrix} \quad (6)$$

To obtain the equivalent DC output power, when AC input power frequency is 50 Hz, $L_2$ and $C_2$ of the above FIG. 12 and $i_8$, $i_9$ and $e_1$ of equation (5) is as follows:

$$\omega L_2 i_8 = e_1 \quad (7)$$
Whereby, $$L_2 = \frac{e_1}{2\pi f i_8} = \left(\frac{100}{100\pi}\right)\left(\frac{1}{0.49 \times 1 \text{ A}}\right) \approx 649 \text{ mH}$$

$\omega C_2 e_1 = i_9$
Whereby, $$C_2 = \frac{0.49 i_1}{2\pi f e_1} = \frac{0.49 \times 1 \text{ A} \times 10^6 \text{ (}\mu\text{F)}}{100\pi \times 100} = 15.6 \text{ }\mu\text{F}$$

$$R_3 = \left(\frac{3}{2}\right)^2 R = 2.25 \times 100 \text{ }\Omega = 225 \text{ }\Omega \quad (8)$$

And,
$E_3 = 1.5 E_1 = 1.35 e_1 = 135$ V $I_3 = \frac{2}{3} I_1 = \frac{2}{3} \times 0.9 \text{ A} = 0.6 \text{ A}$ $P_{DC} = E_3 I_3 = 0.81 e_1 i_1 = 81$ W
$P_{AC} = e_1 \cdot 0.85 i_1 = 85$ W Voltage and current wave forms of Single phase input-Three phase full bridge rectifier circuit by Fast Fourier transform is as shown in FIG. 13 when the constant of the above equation (7) is the base.

<1> of FIG. 13 shows a wave form when single phase AC power supply voltage ($e_1$) (Effective value 100V) is built up from zero phase of a sine wave.

<2> shows voltage ($e_L$) of a choke coil ($L_2$).
<3> shows voltage ($e_C$) of a capacitor ($C_2$).
<4> shows DC output voltage ($E_3$).

These Fig. show that $e_L$ advances 60° from $e_1$ and $e_C$ delays 60° from which demonstrates the occurrence of equivalent 3 phase voltage.

<5>~<8> of FIG. 13 show the corresponded current wave forms of each part. <5> shows AC input current ($i_7$), <6> shows AC current ($i_8$) of a choke coil ($L_2$), <7> shows AC current ($i_9$) of a capacitor ($C_2$), and <8> shows DC output current ($I_3$).

According to FIG. 13 <4>, ripple voltage is a little larger than the wave form of a normal 3 phase full bridge. It is supposed to be caused by that AC current (i9) running through a capacitor ($C_2$) of FIG. 13 <7> is not a sine wave and largely changed at the switching time of current of 3 phase diode, whereby, it includes a lot of 5th harmonic.

And, as the current wave form of FIG. 13 <5> is near to the AC current wave form of a general 3 phase full bridge rectifier circuit, it is also supposed that input power factor of the invented Single phase input-Three phase full bridge rectifier circuit is about Unity.

When ripple voltage involved in DC output voltage is reduced by changing the value of a capacitor ($C_2$), inductance of a choke coil ($L_2$) has the calculated value from the theoretical value when assuming sine wave operation, and a capacitor ($C_2$) has its best value (minimum value of ripple voltage) at 90% of theoretical value.

For example, when a high frequency DC-DC converter or a DC-AC inverter for pulse width control is connected after this circuit, some level of ripple is considered to be input voltage variation and is possible to sufficiently smoothing by constant voltage control. It is also improved by insertion of a simple filter.

Figure 14A:
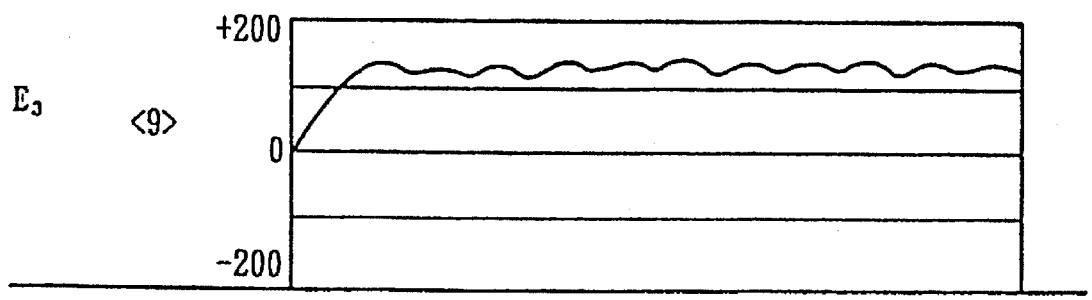
FIGS. 14a–14c show voltage wave forms at load variation of the invented Single phase input-Three phase full bridge rectifier circuit.
Figure 14B:
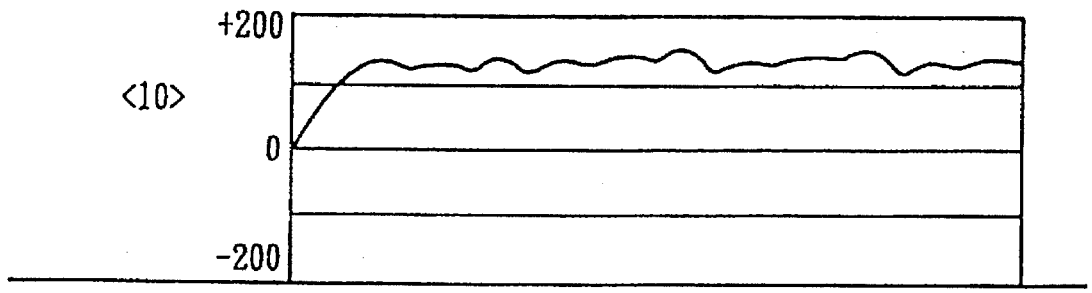
Figure 14C:
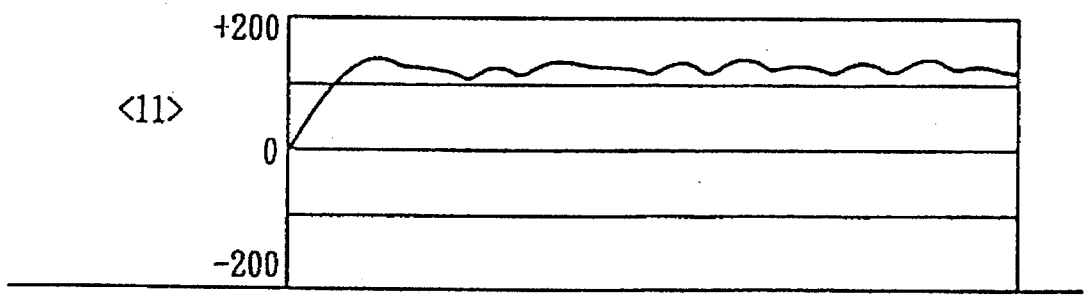

FIG. 14 <9>~<11> show the variation range of 3 phase full bridge output wave form when load resistance value changes by +10%, −10% on the hypothesis that the load controls constant voltage or constant current against input voltage variation. FIG. 14 <9> shows DC output voltage ($E_3$) in this case, which has rather larger ripple voltage than perfect 3 phase full bridge output but fully smaller than single phase full bridge and 3 phase half bridge. This is a small matter for actual use.

Furthermore, <10> and <11> show that ripple or average value of output voltage are different from the best value of <9>, which is also a small matter for actual use.

Equivalent 3 phase full bridge rectifier operation is confirmed by using computer simulation and actual experiments, and the correctness of simulation is confirmed.

And, FIG. 15 shows the result of a test to demonstrate the invented Single phase input-Three phase full bridge rectifier circuit. This result demonstrates conformity of theoretical value and measurement value in spite of slightly leading error of measurement instrument.

EXAMPLE 2

Figure 16B:
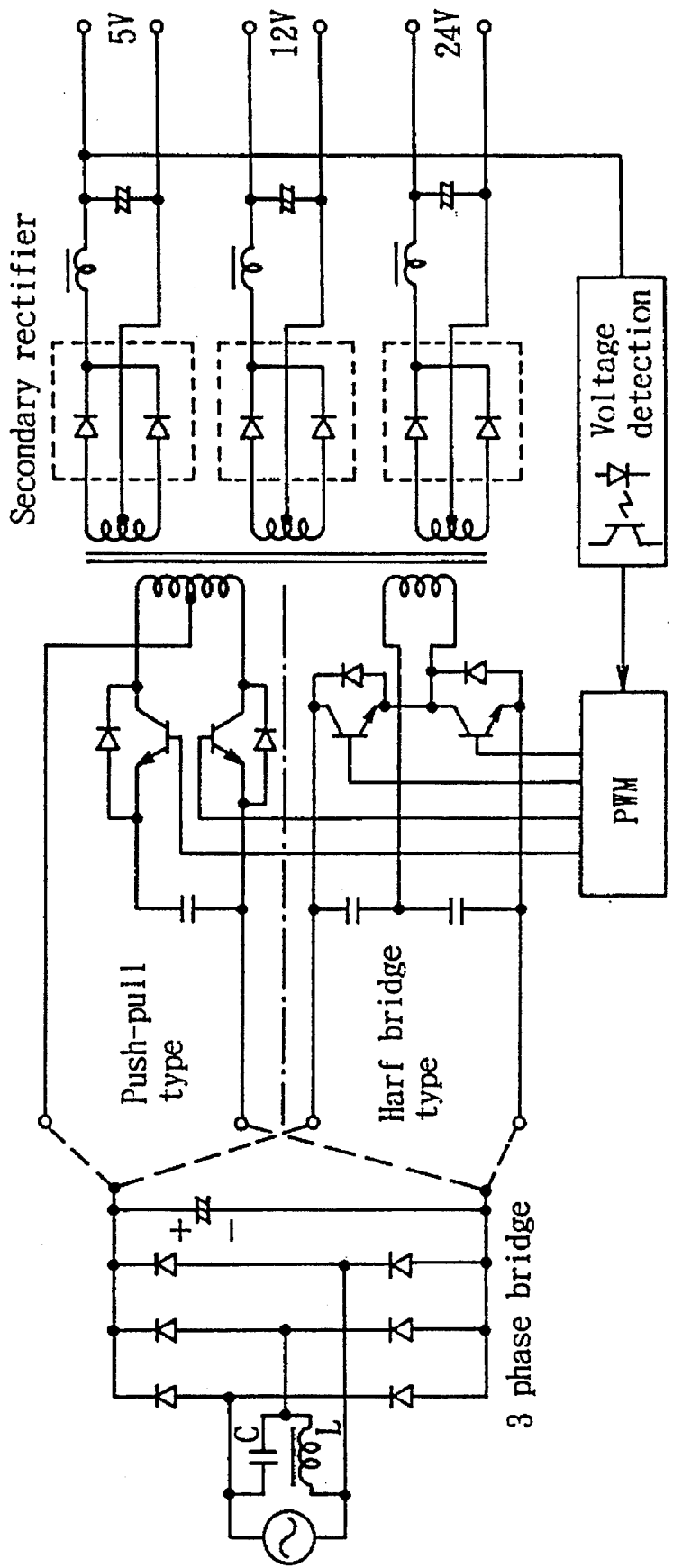
FIGS. 16 (A)(B) show circuit configurations showing each actual example of the invented Single phase input-Three phase full bridge rectifier circuit applied for switching regurators.

FIG. 16 (A)(B) show example configurations of the invented Single phase input-Three phase full bridge rectifier circuit applied to a conventional DC-DC converter. By replacing the conventional single phase full bridge with a 3 phase full bridge, 15% reduction of effective AC input power is possible, approx. 95% ~99% power factor is maintained, and power line harmonic energy is extremely reduced.

EXAMPLE 3

Figure 17A:
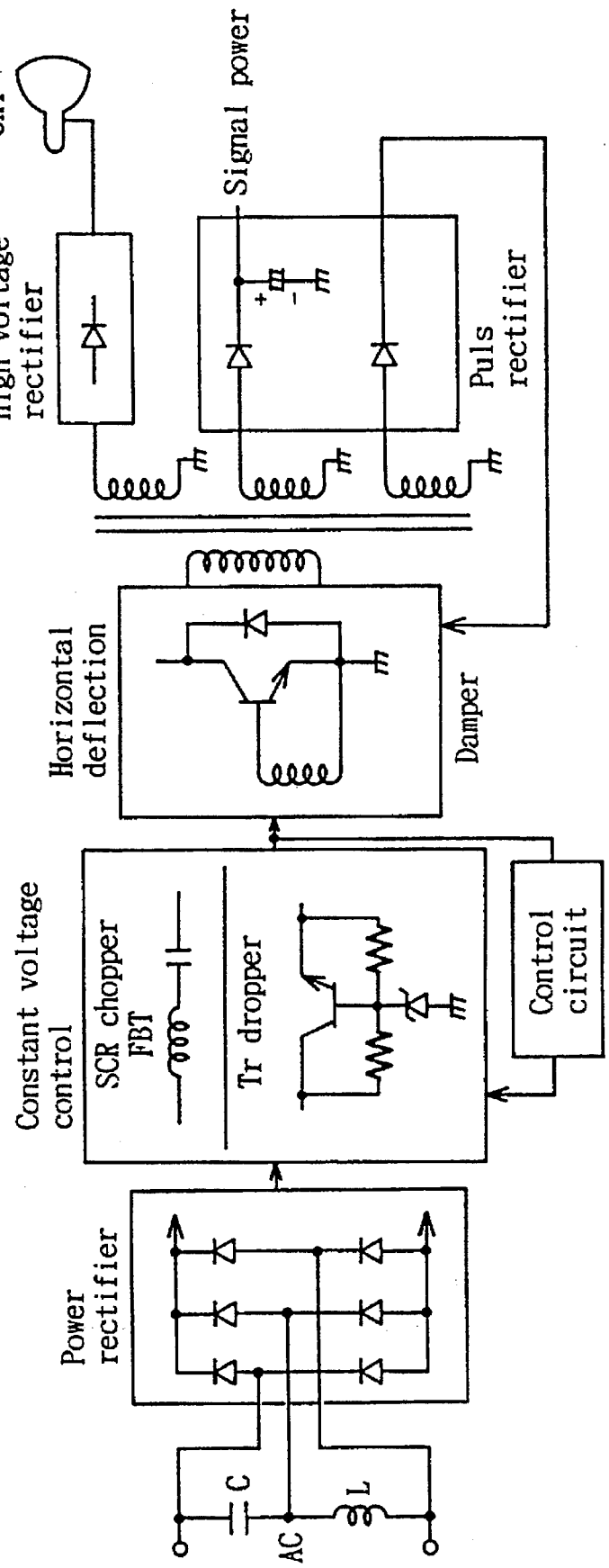
FIG. 17 (A)(B)(C) shows circuit configurations showing each actual example of the invented Single phase input-Three phase full bridge rectifier circuit applied for television receivers.
Figure 17B:
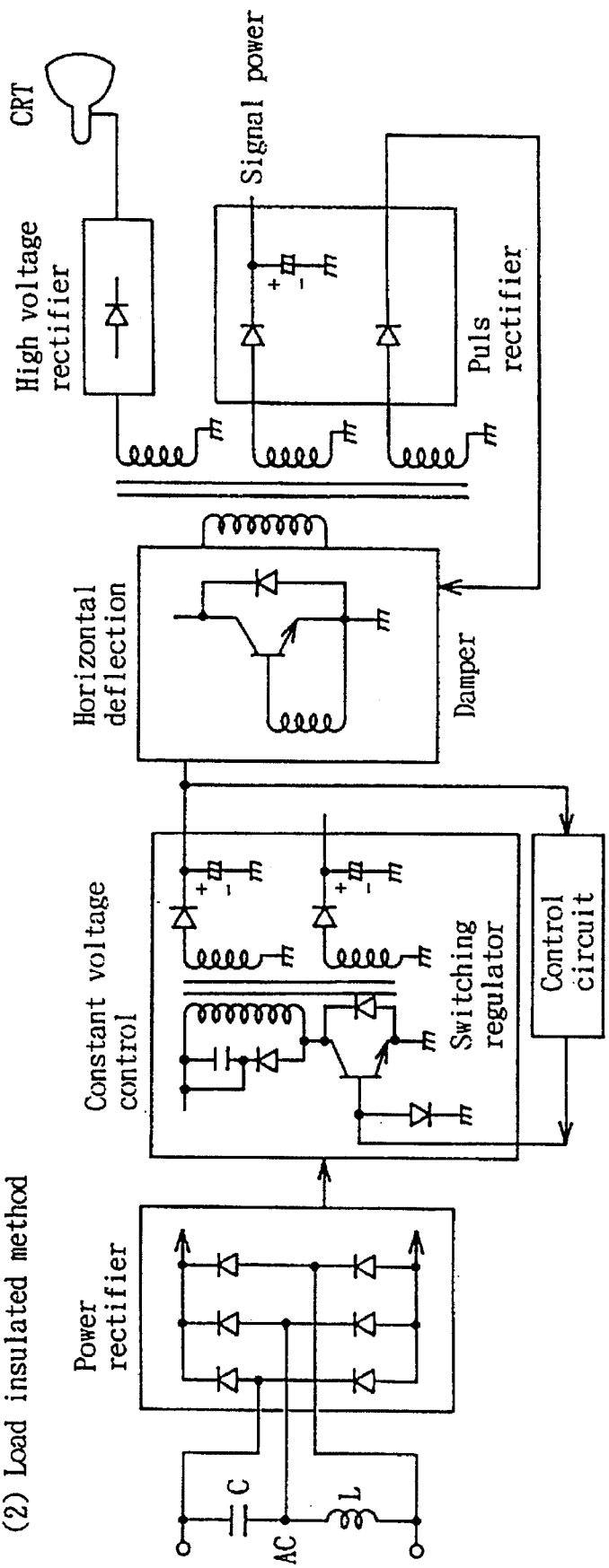
Figure 17C:
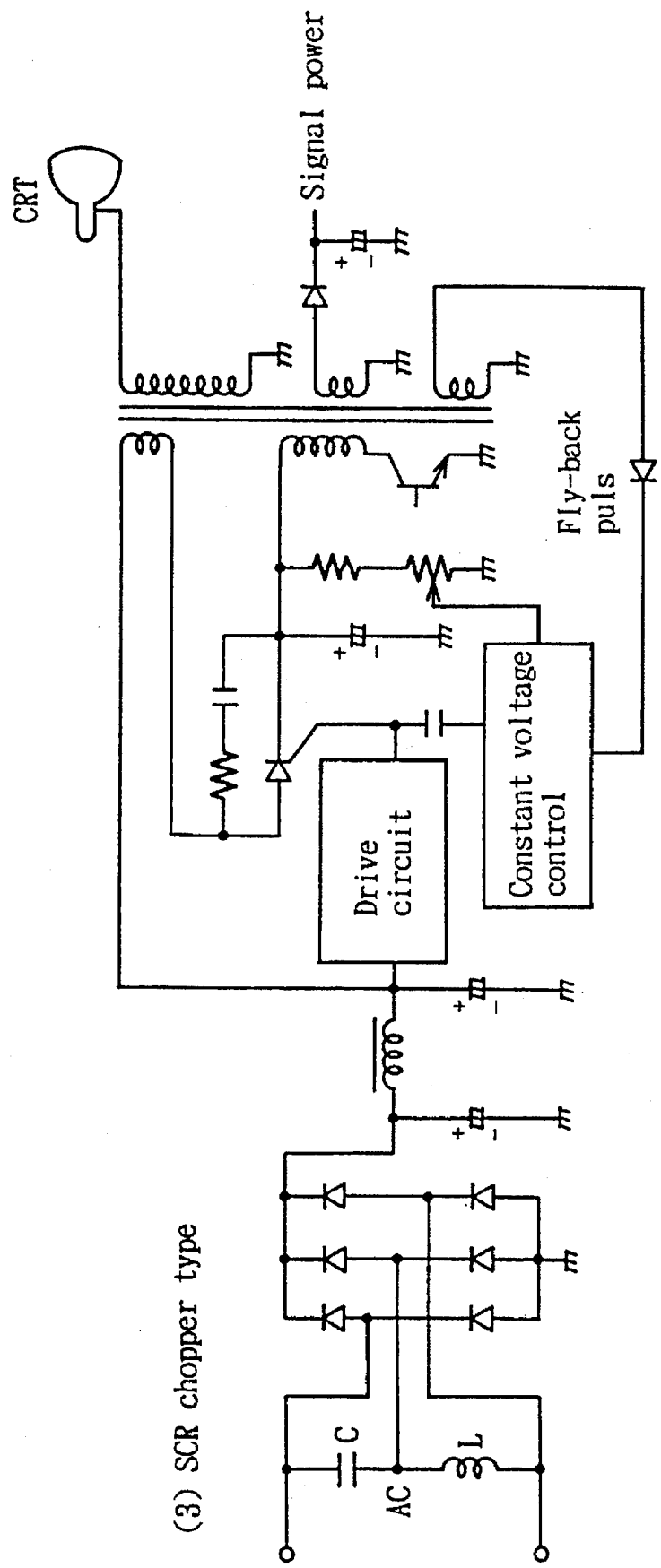
Figure 18:
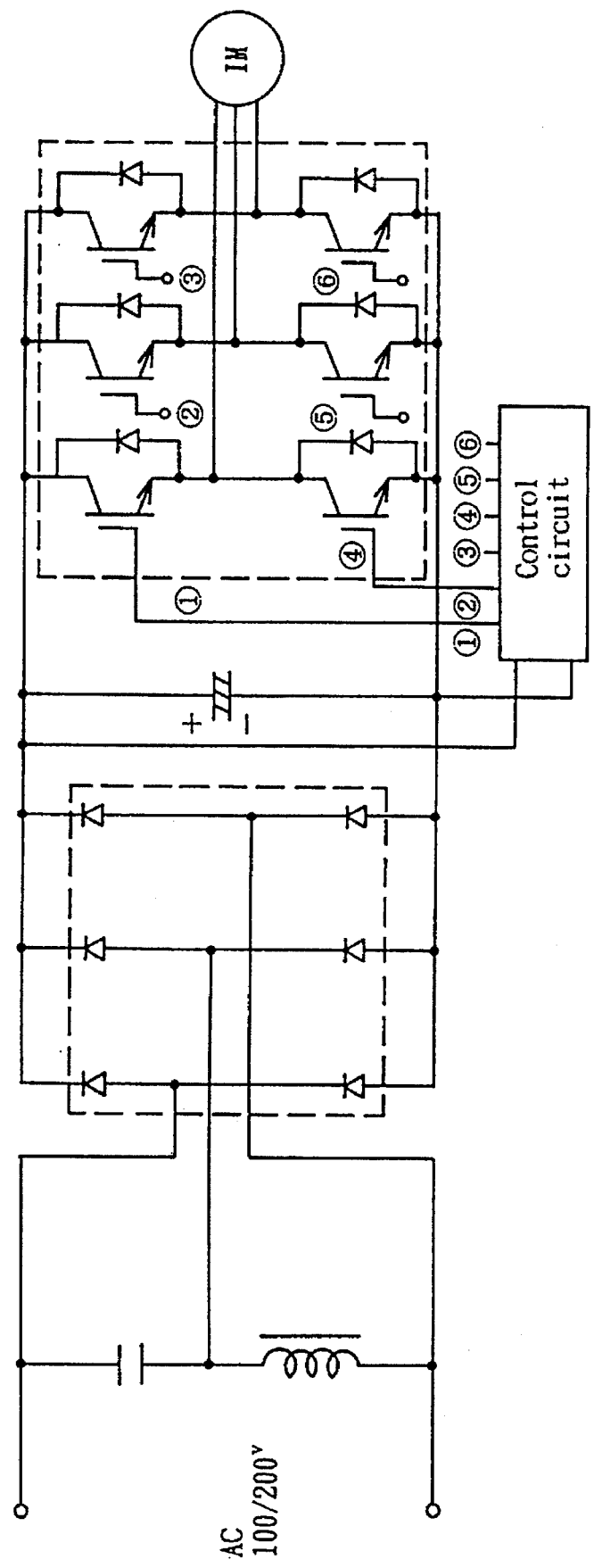
FIG. 18 shows a circuit configuration showing an actual example of the invented Single phase input-Three phase full bridge rectifier circuit applied for motor controller.
Figure 19:
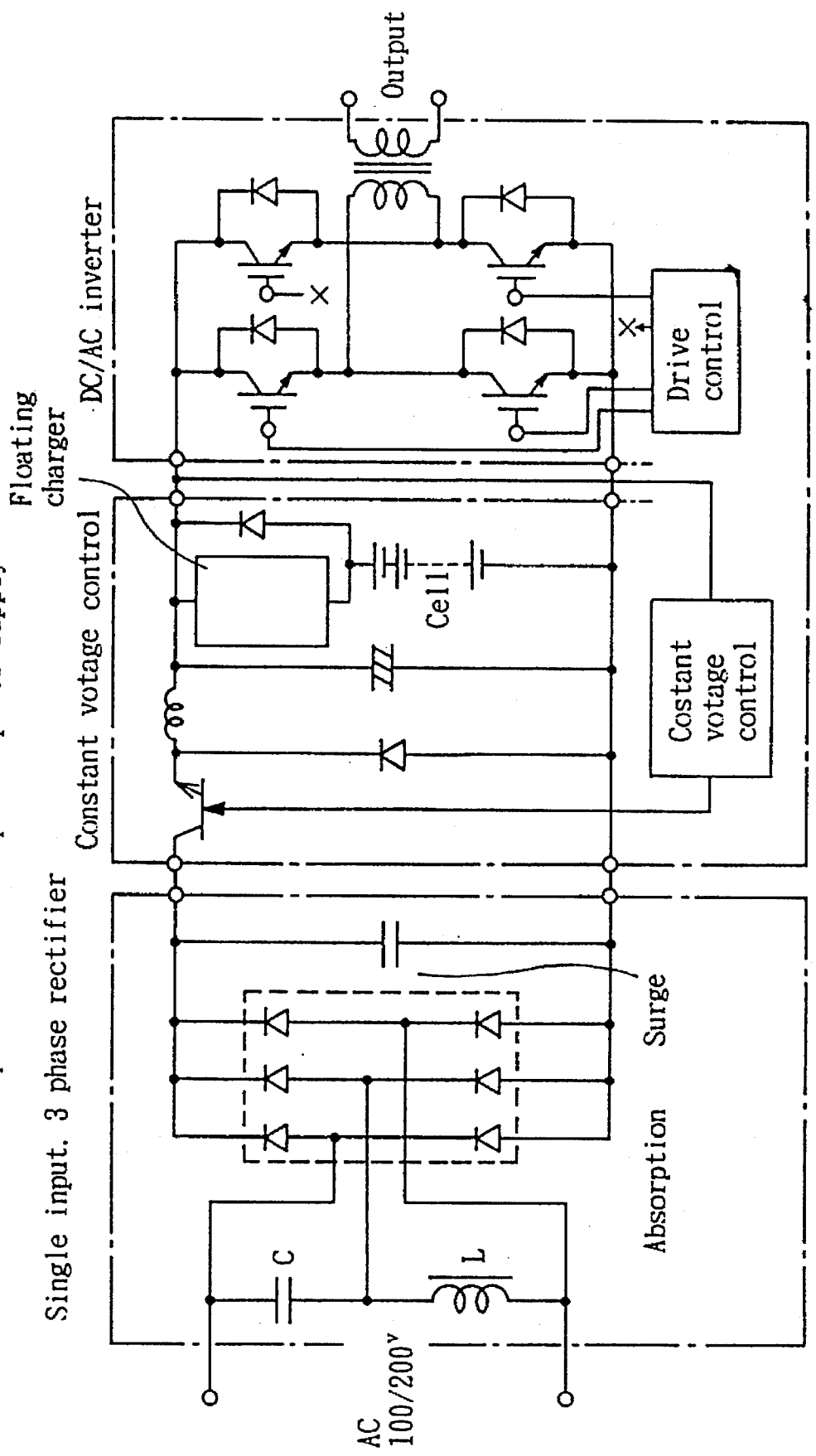
FIG. 19 shows a circuit configuration showing an actual example of the invented Single phase input-Three phase full bridge rectifier circuit applied for uninterruptible power supply.
Figure 20:
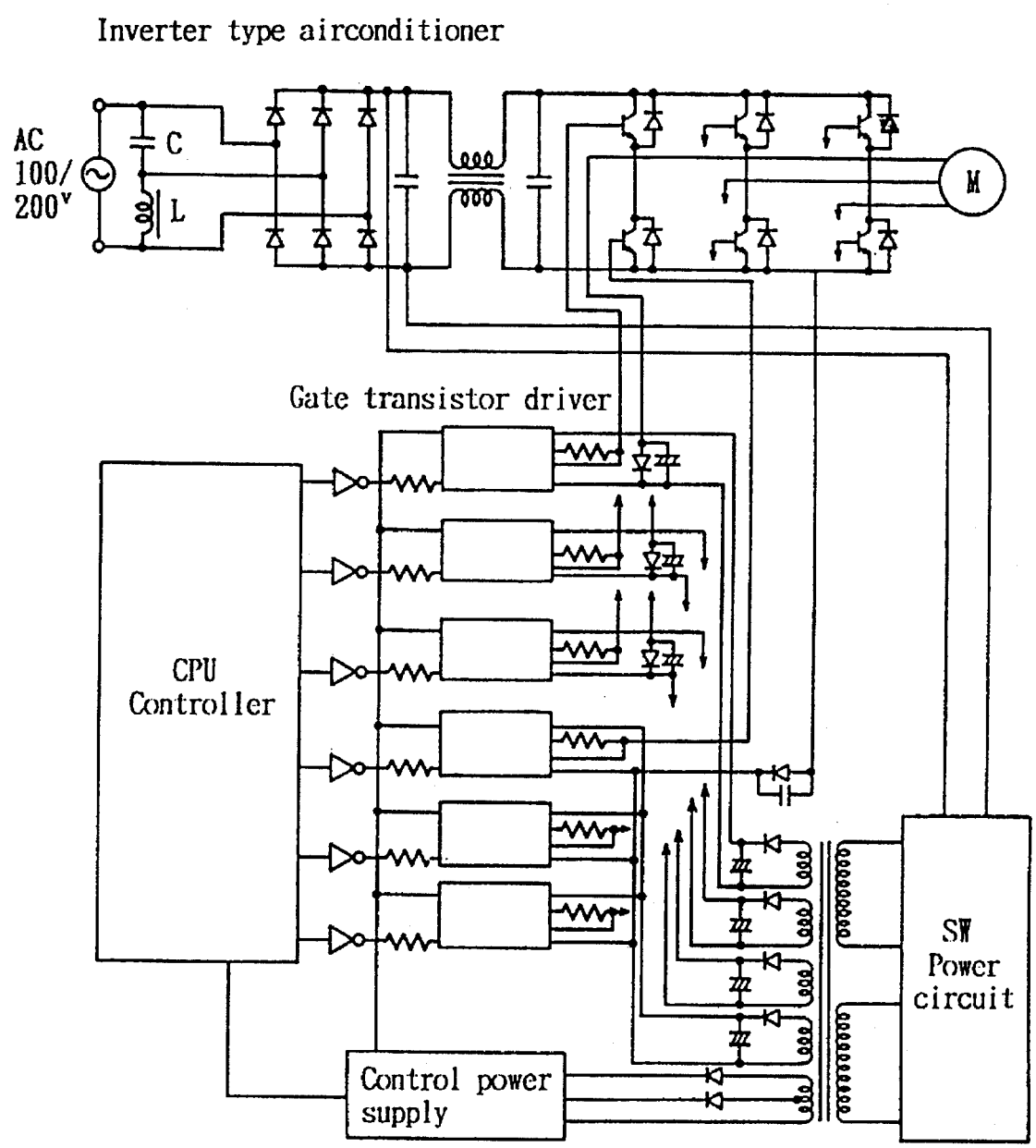
FIG. 20 shows a circuit configuration showing an actual example of the invented Single phase input-Three phase full bridge rectifier circuit applied for inverter type air conditioner.
Figure 21:
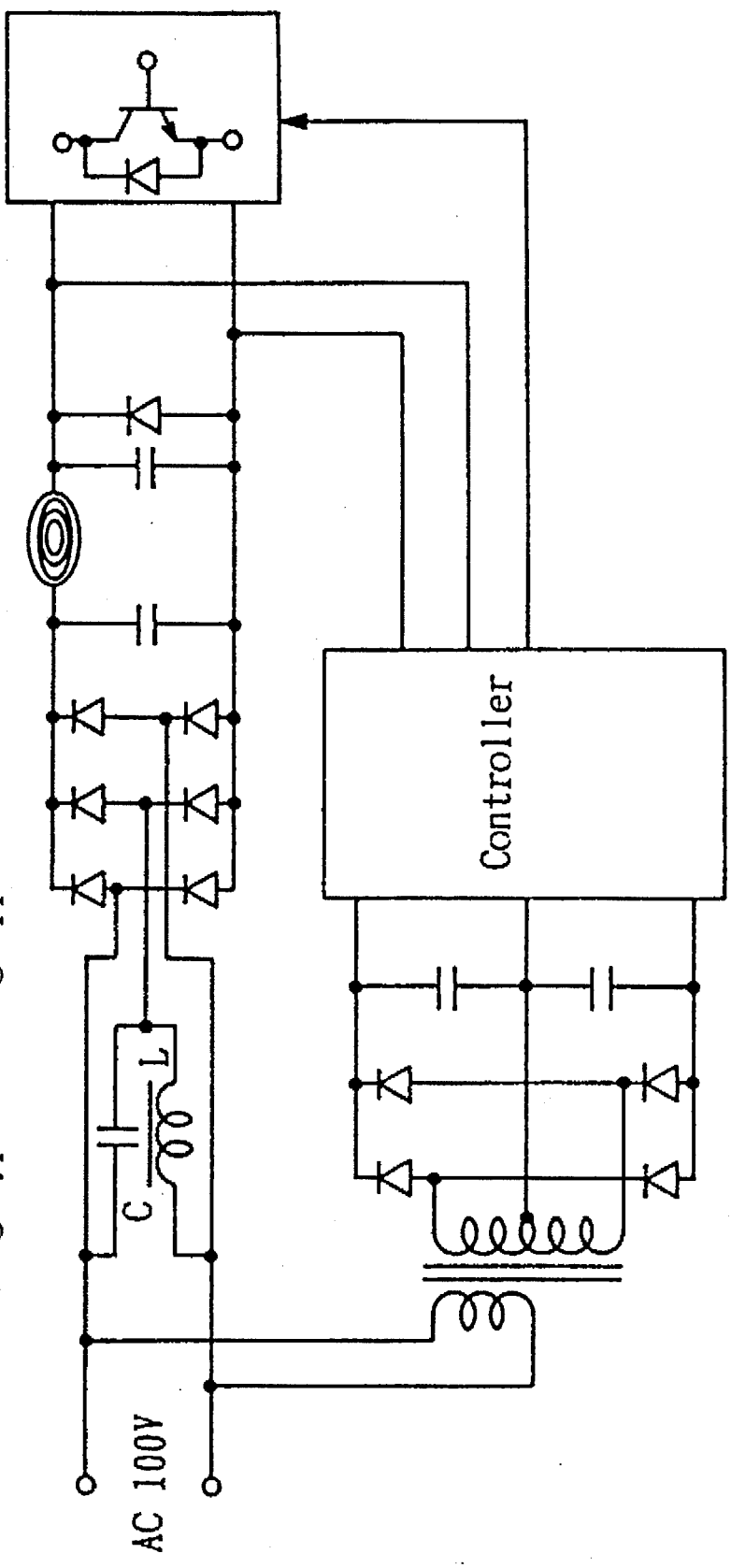
FIG. 21 shows a circuit configuration showing an actual example of the invented Single phase input-Three phase full bridge rectifier circuit applied for induction heating type cooking apparatus.

FIG. 17 (A)(B)(C) show examples of the invented Single phase input-Three phase full bridge rectifier circuit applied for many kinds of large or small TV receiver. The method for connection is as same as Example 2, and the single phase full bridge part of a public TV receiver is replaced by this invented type.

As a result, AC input power, power factor and power line harmonic energy are improved such as Example 2.

EXAMPLE 4

FIG. 18, FIG. 19, FIG. 20 and FIG. 21 show example configurations when the actual example of the invented single phase input-Three phase full bridge rectifier circuit is incorporated into the rectifier part of a DC-AC inverter which produces 3 phase or single phase AC output.

In particular, equivalent conversion efficiency to 3 phase AC is given by using single phase input. That is, energy saving, high power factor and operation with little power line harmonic energy are realized.

EXAMPLE 5

Figure 22:
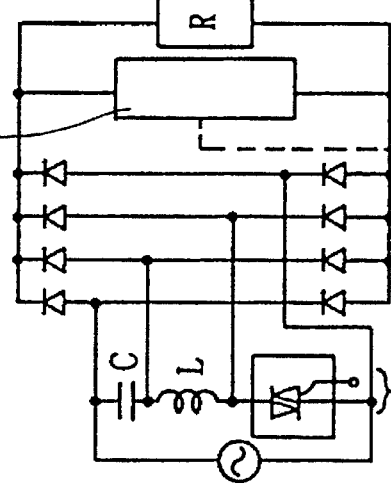
FIG. 22 shows each testing value of the Invented Single phase input-Pseudo four phase full bridge rectifier circuit.

The test result to demonstrate the invented Single phase input-Pseudo four phase full bridge rectifier circuit is as shown in FIG. 22. The result shows the conformity of theoretical value and measurement value in spite of slightly difference by a mesurement instrument.

Figure 23A:
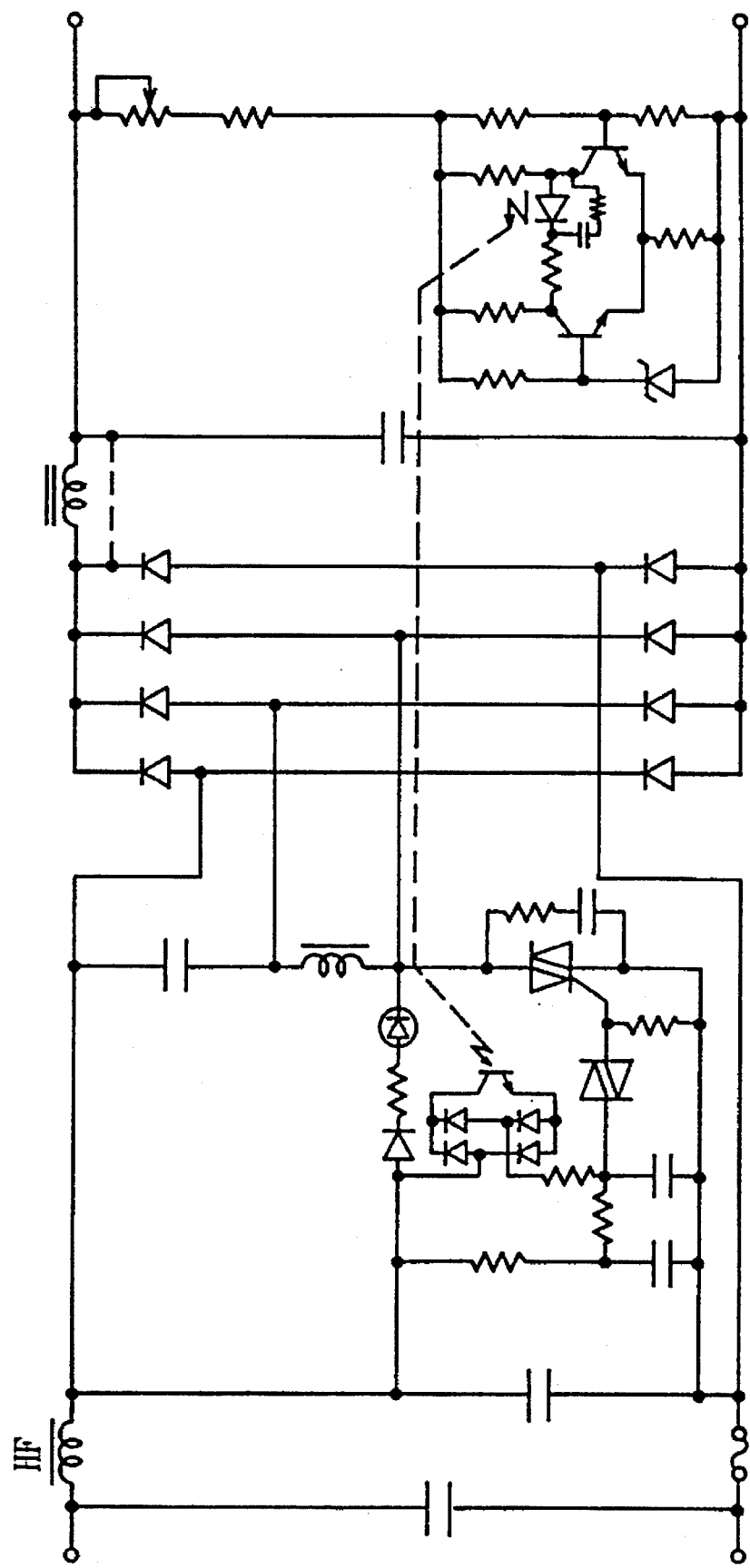
FIG. 23 (A)(B) show circuit configurations showing each actual example of the invented Single phase input-Pseudo four phase full bridge rectifier circuit.
Figure 23B:
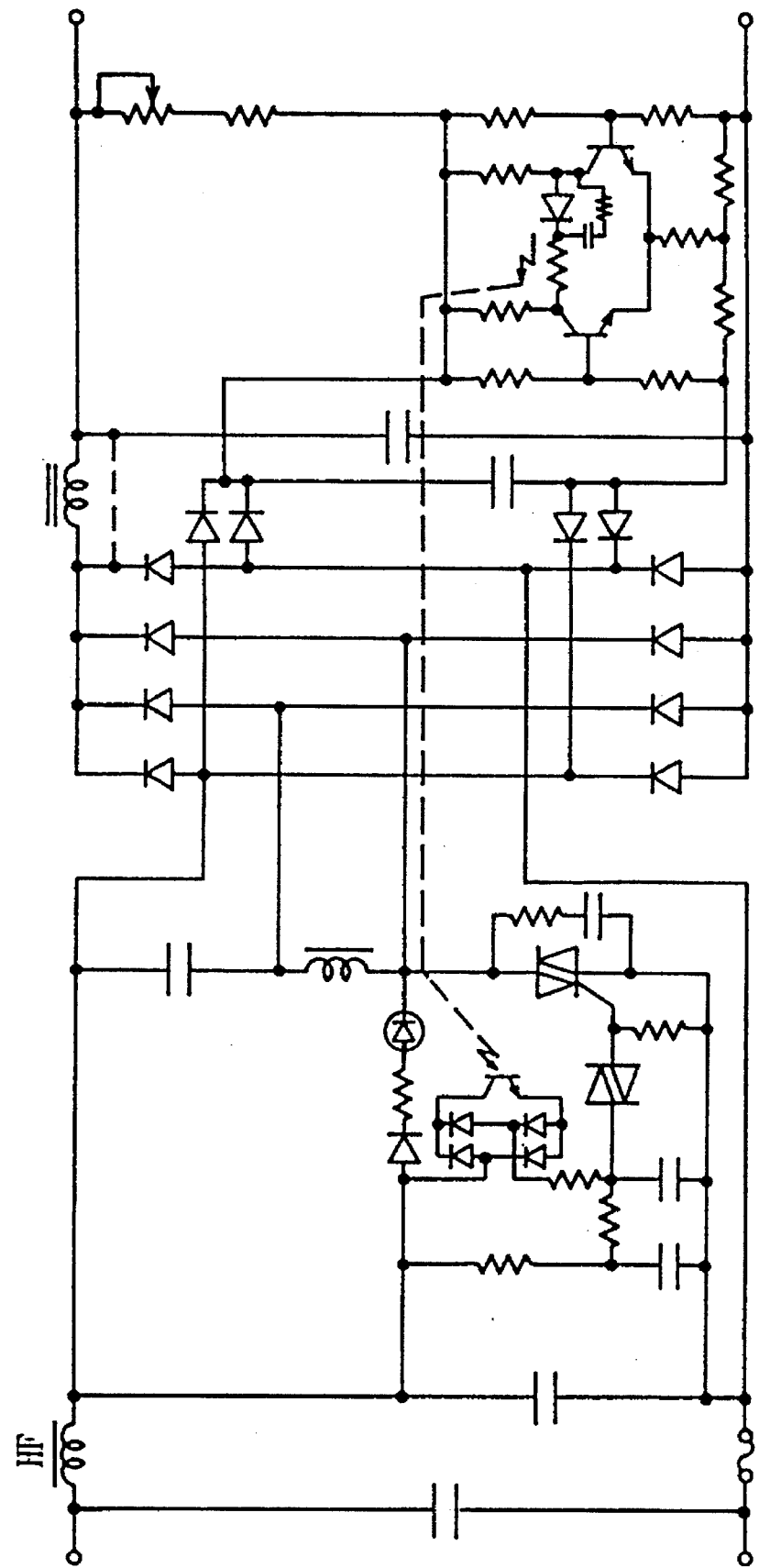

FIG. 23. (A)(B) show example configurations of the invented Single phase input-Pseudo four phase full bridge rectifier circuit used for this test.

FIG. 23 (A) shows an example configuration of a circuit for constant voltage control over DC load variation.

FIG. 23 (B) shows an example configuration of a circuit to improve power factor and a constant voltage control circuit is not involved.

EXAMPLE 6

Figure 24A:
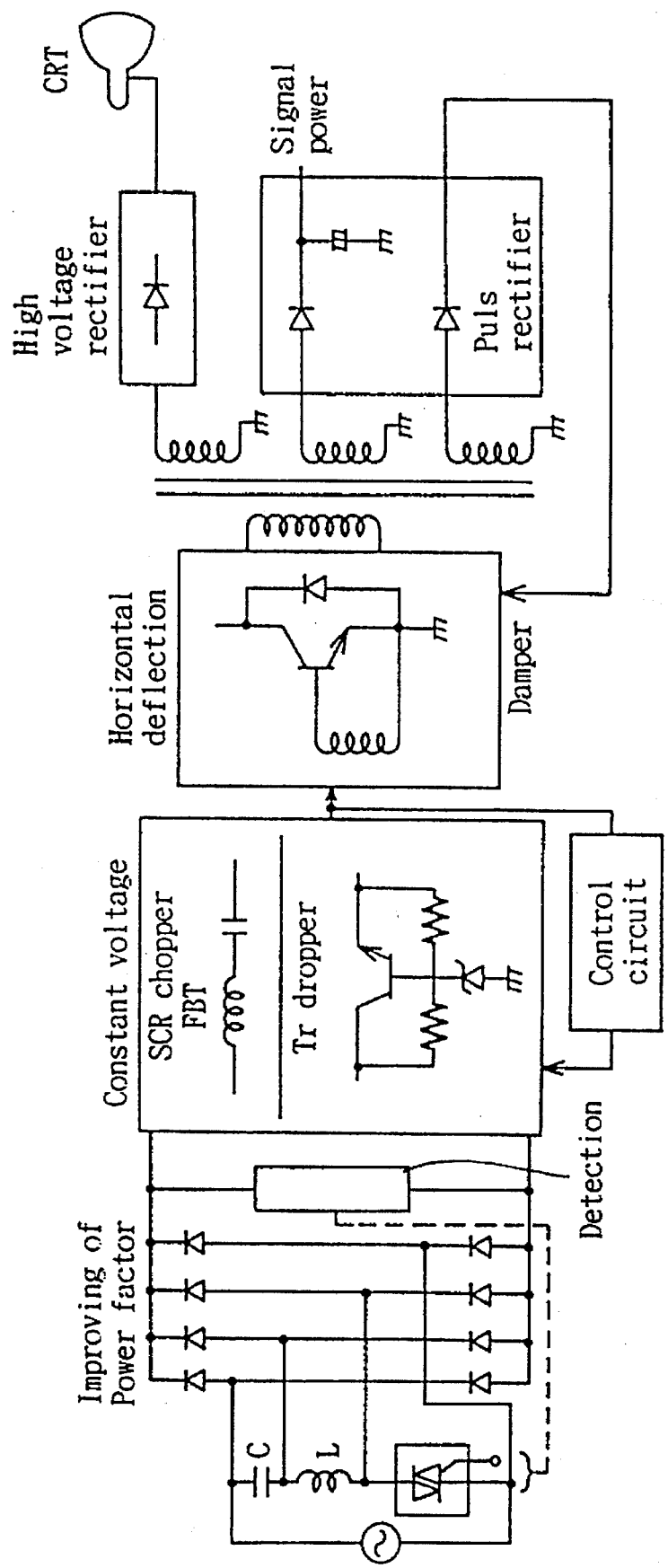
FIG. 24 (A)(B)(C) show circuit configurations showing each actual example of the invented Single phase input-Pseudo four phase full bridge rectifier circuit applied for television receivers.
Figure 24B:
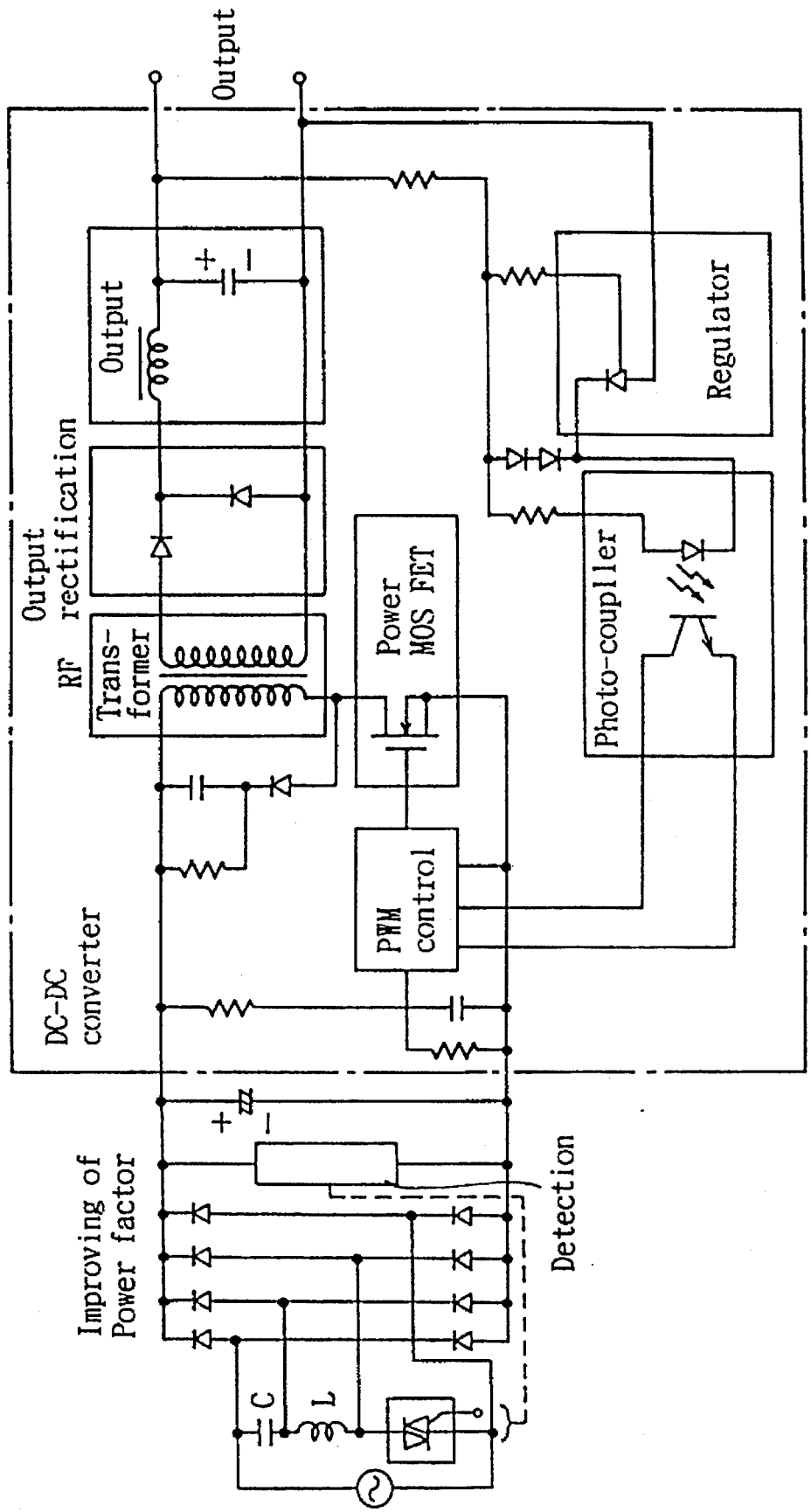
Figure 24C:
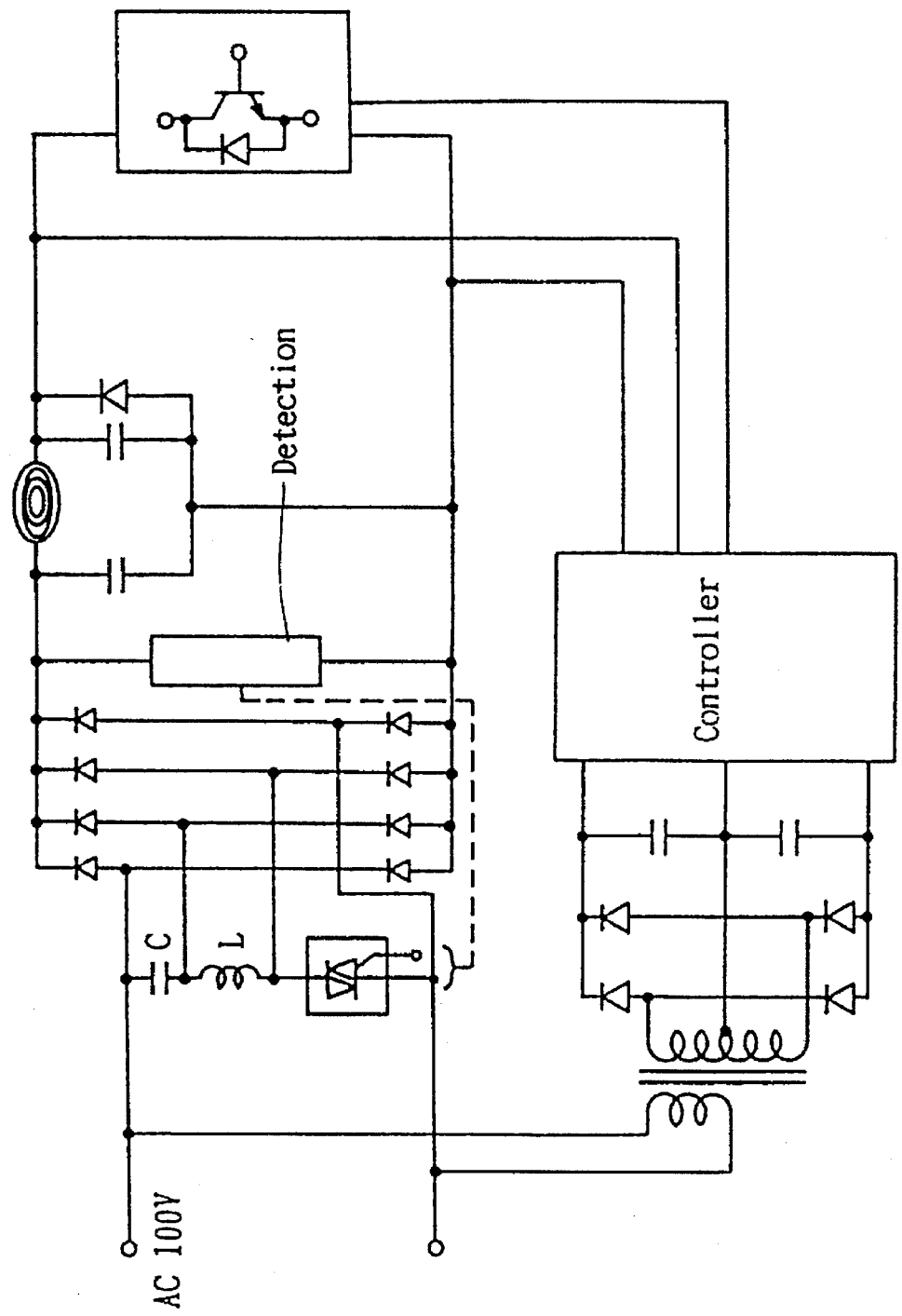

FIG. 24 (A)(B) and (C) show example configurations of the invented Single phase input-Pseudo four phase full bridge rectifier circuit when applied to a conventional DC-DC converter.

By replacing the conventional single phase full bridge with a equivalent 4 phase full bridge, effective AC input power is reduced by about 10%, approx. 95%~99% power factor is maintained and power line harmonic energy is extremely reduced.

EXAMPLE 7

Figure 25:
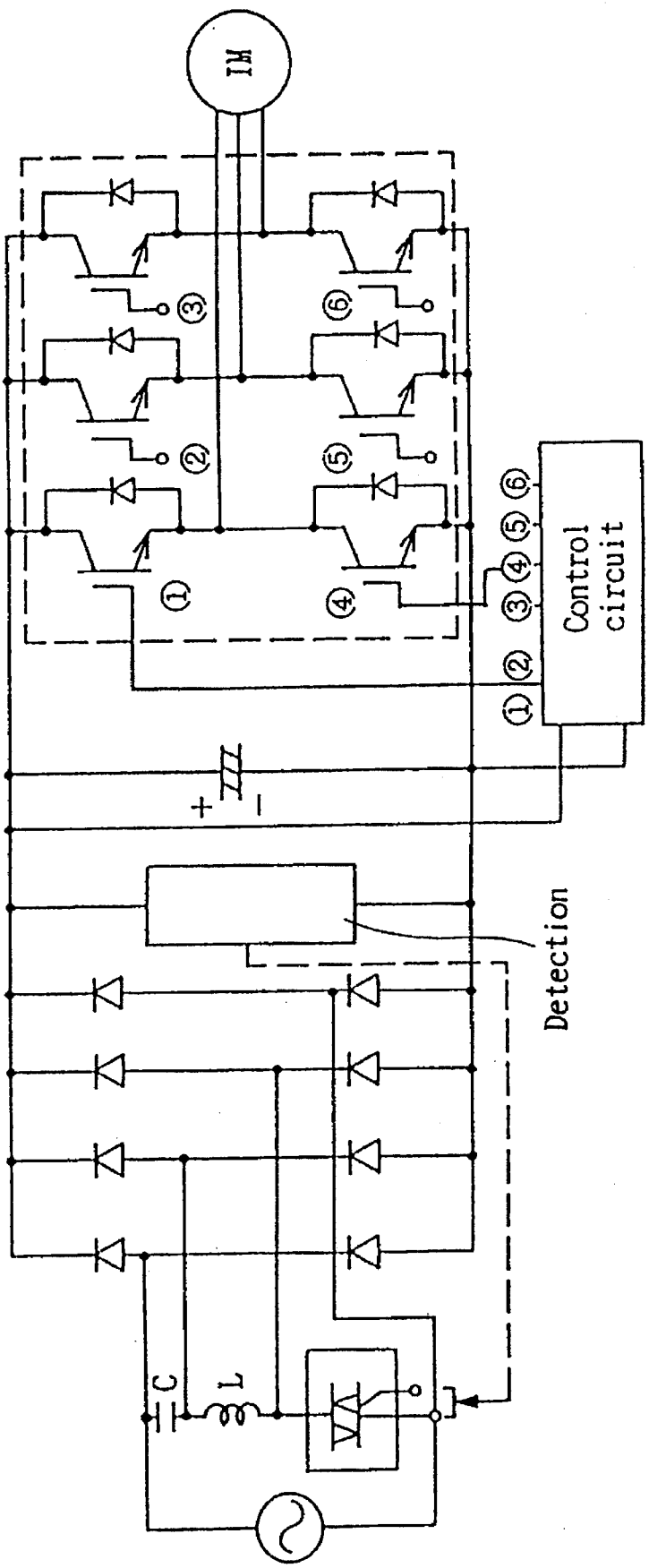
FIG. 25 shows a circuit configuration showing an actual example of the invented Single phase input-Pseudo four phase full bridge rectifier circuit applied for motor controller.
Figure 26:
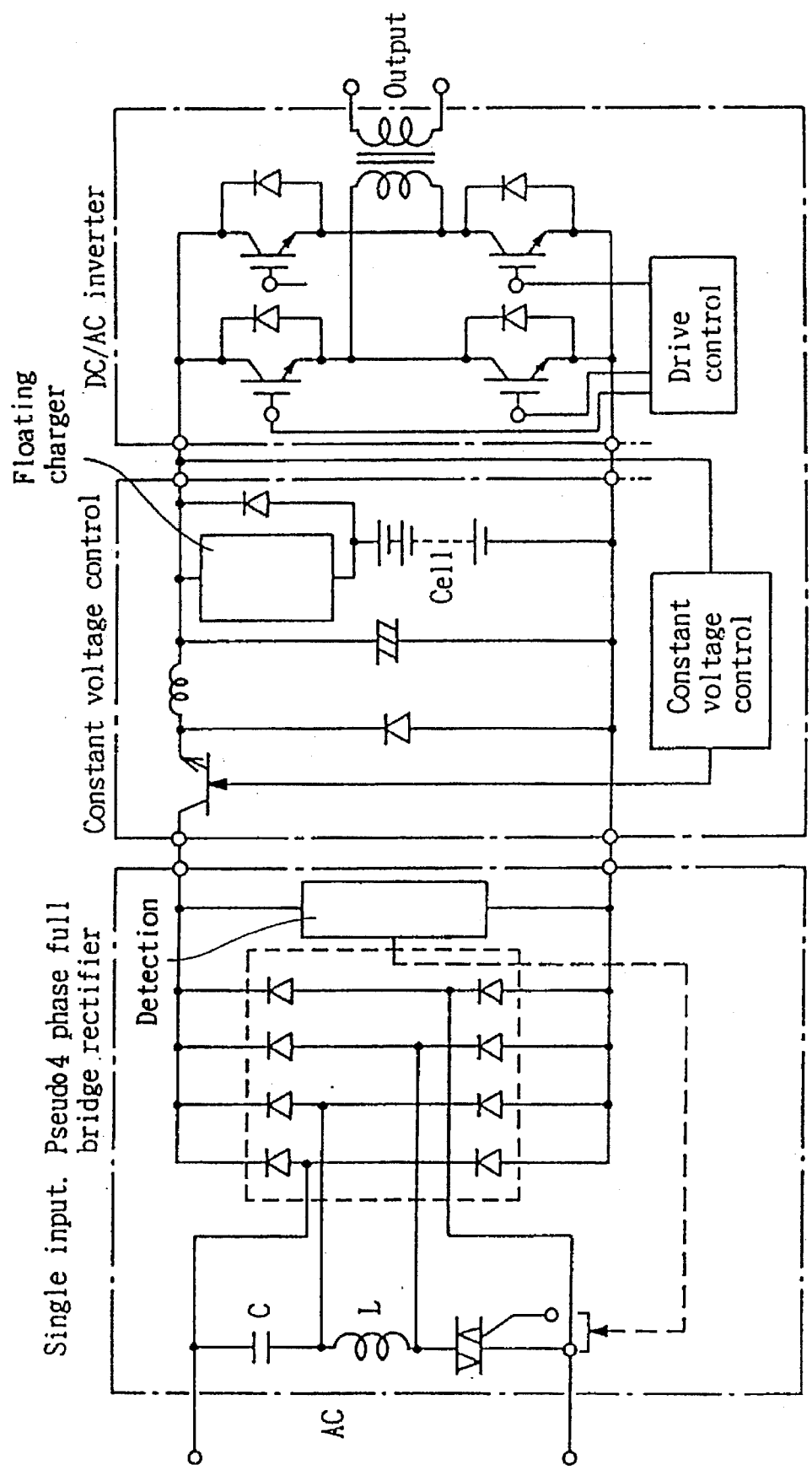
FIG. 26 shows a circuit configuration showing an actual example of the invented Single phase input-Pseudo four phase full bridge rectifier circuit applied for uninterrupt power supply.

FIG. 25 and FIG. 26 shows example configurations when the actual example of the invented Single phase input-Pseudo four phase full bridge rectifier circuit is incorporated into the rectifier part of a DC-AC inverter which produces 3 phase or single phase AC output.

In particular, better conversion efficiency than single phase full bridge rectifier is given by using single phase input. That is, energy saving, high power factor and operation with little power line harmonic energy are possible.

Of course, this invention is possible to be used in many cases not only in the above examples. Though the concrete example is not shown here, for example, it is possible to constitute for economy a single phase input 3 phase full bridge rectifier circuit or a single phase input 4 phase full bridge rectifier circuit which can realize the characteristics of unbalanced 3 phase AC full bridge rectifier having an inferior wave form to a full bridge rectified wave form of normal 3 phase AC input by connected with a choke coil, a capacitor and 3 phase full bridge rectifier elements or 4 phase full bridge rectifier elements, whose value is away from the best value depending on the load of output terminals.

It is also possible to constitute a single phase input 3 phase full bridge rectifier circuit or a single phase input 4 phase full bridge rectifier circuit having a mechanism to cut off the above invented capacitor or choke coil circuit corresponding to shutting down the main load circuits without partial function circuit, when main load is idle condition.

As precisely explained above, the invented Single phase input-Three phase full bridge rectifier circuit makes DC conversion with little harmonic component possible by using 3 phase full bridge rectifier circuit.

And it is also possible to obtain equivalent conversion efficiency to 3 phase AC circuit. 10% reduction of power consumption is possible compared with the conventional circuit, and 95~99% power factor is maintained. Besides, harmonic component to AC input power line side is extremely reduced.

The invented Single phase input-Pseudo four phase full bridge rectifier circuit makes DC conversion with little harmonic component possible by using 4 phase full bridge rectifier circuit, and it is also possible to obtain equivalent conversion efficiency to 3 phase AC circuit. 10% reduction of power consumption is possible compared with the conventional circuit, and 90~98% power factor is maintained. Furthermore, harmonic component to AC input power supply side is extremely reduced.

By using bidirectional semiconductor phase control element, as variable inductance plus fixed choke coil configuration, it makes a choke coil small and light weight. And, constant voltage control can be given by using a triac as a bidirectional semiconductor phase control element.

Moreover, it can give a single phase input 3 phase full bridge rectifier circuit and a single phase input pseudo 4 phase full bridge rectifier circuit which have a little increase of cost and limitation free on power capacity range.

It is possible to supply equivalently 3 phase AC power or 3 phase full bridge rectified power from a single phase AC input circuit by using this invention and possible to operate them.

We claim:

1. A three phase full bridge rectifier circuit, comprising:
    a single phase AC voltage source, having first and second source terminals, for providing a single phase AC input voltage;
    a phase conversion circuit for converting the single phase AC input voltage into a three phase AC voltage, said phase conversion circuit including an inductor and a capacitor; and
    a three phase full bridge rectifier circuit for converting said three phase AC voltage into a rectified voltage to be applied to a load resistance, said three phase full bridge rectifier circuit having first, second and third input terminals,
    wherein the first source terminal of said single phase AC voltage source is coupled with one terminal of said capacitor, and the second source terminal of said single phase AC voltage source is coupled with one terminal of said inductor,
    wherein another terminal of said capacitor is coupled with another terminal of said inductor so as to define a third terminal therebetween,
    wherein said first and second source terminals of said single phase AC voltage source are respectively coupled with said first and third input terminals of said three phase full bridge rectifier circuit, and said third terminal is coupled with said second input terminal of said three phase full bridge rectifier circuit, and wherein respective values of said capacitor and said inductor are set corresponding to a value of the DC load resistance to form said three phase AC voltage.

2. A three phase full bridge rectifier circuit as claimed in claim 1, further comprising said DC load resistance which is a DC-DC converter.

3. A pseudo four phase full bridge rectifier circuit, comprising:

a single phase AC voltage source, having first and second source terminals, for providing a single phase AC input voltage;

a phase conversion circuit for converting said single phase AC input voltage into a four phase AC voltage, said phase conversion circuit including an inductor, a capacitor, and a bi-directional semiconductor switch; and a four phase full-bridge rectifier circuit for converting said four phase AC voltage into a rectified voltage to be applied to a load, said four phase full bridge rectifier circuit having first, second, third and fourth input terminals, wherein the first source terminal of said single phase AC voltage source is coupled with one terminal of said capacitor, and the second source terminal of said single phase AC voltage source is coupled with one terminal of said bi-directional semiconductor switch, wherein another terminal of said capacitor is coupled with one terminal of said inductor so as to define a third terminal therebetween, wherein another terminal of said inductor is coupled with another terminal of said bi-directional semiconductor switch to define a fourth terminal therebetween, wherein said first and second source terminals of the single phase AC voltage source are respectively coupled with said first and fourth input terminals of said four phase full-bridge rectifier, said third terminal is coupled with said second input terminal of said four phase full bridge rectifier, and said fourth terminal is coupled with third input terminal of said four phase full-bridge rectifier, wherein respective values of said capacitor and said inductor are set corresponding to a value of the DC load resistance to form said four phase AC voltage, and a phase angle of said bi-directional semiconductor switch is varied in accordance with a variation of the AC input voltage or a DC output load current.

4. A pseudo four phase full bridge rectifier circuit as claimed in claim 3, further comprising the DC load resistance which is a DC-DC converter.

5. A pseudo four phase full bridge rectifier circuit as claimed in claim 3, further comprising the DC load resistance which is a DC-AC inverter.

6. A pseudo four phase full bridge rectifier circuit as claimed in claim 3, wherein a maximum DC output voltage is controlled to be equal to a maximum AC input voltage.

7. A pseudo four phase full bridge rectifier circuit as claimed in claim 3, wherein said bi-directional semiconductor switch is a triac.

8. A three phase full bridge rectifier circuit as claimed in claim 1, further comprising said DC load resistance which is an electronic apparatus.

9. A pseudo four phase full bridge rectifier circuit as claimed in claim 3, further comprising said DC load resistance which is an electronic apparatus.

10. A three phase full bridge rectifier circuit as claimed in claim 1, further comprising said DC load resistance which is an AC output equipment.

11. A pseudo four phase full bridge rectifier circuit as claimed in claim 3, further comprising said DC load resistance which is an AC output equipment.

12. A three phase full bridge rectifier circuit as claimed in claim 1, wherein the values of said inductor and said capacitance are set so as to deviate from an optimum inductance and capacitance.

13. A pseudo four phase full bridge rectifier circuit as claimed in claim 3, wherein the values of said inductor and said capacitance are set so as to deviate from an optimum inductance and capacitance.

14. A three phase full bridge rectifier circuit as claimed in claim 1, further comprising a cut off device to cut off at least one of said capacitor and said inductor during an output load idle condition.

15. A three phase full bridge rectifier circuit for rectifying a single phase AC input voltage from an AC voltage source, comprising:

a phase conversion circuit for converting the single phase AC input voltage into a three phase AC voltage, said phase conversion circuit including an inductor and a capacitor; and a three phase full bridge rectifier circuit for converting said three phase AC voltage into a rectified voltage to be applied to a load resistance, said three phase full bridge rectifier circuit having first, second and third input terminals, wherein one terminal of said capacitor is for coupling with a first source terminal of the AC voltage source, and one terminal of said inductor is for coupling with a second source terminal of the AC voltage source, wherein another terminal of said capacitor is for coupling with another terminal of said inductor so as to define a third terminal therebetween, wherein with said first and third input terminals of said three phase full bridge rectifier circuit are for respectfully coupling with the first and second source terminals of the AC voltage source, and wherein said third terminal is coupled with said second input terminal of said three phase full bridge rectifier circuit, and wherein respective values of said capacitor and said inductor are set corresponding to a value of the DC load resistance to form said three phase AC voltage.

16. A pseudo four phase full bridge rectifier circuit for rectifying a single phase AC input voltage from an AC voltage source, comprising:

a phase conversion circuit for converting the single phase AC input voltage into a four phase AC voltage, said phase conversion circuit including an inductor, a capacitor, and a bi-directional semiconductor switch; and a four phase full-bridge rectifier circuit for converting said four phase AC voltage into a rectified voltage to be applied to a load, said four phase full bridge rectifier circuit having first, second, third and fourth input terminals, wherein one terminal of said capacitor is for coupling with a first source terminal of the AC voltage source, and one terminal of said bi-directional switch is for coupling with a second source terminal of the AC voltage source, wherein another terminal of said capacitor is coupled with one terminal of said inductor so as to define a third terminal therebetween, wherein another terminal of said inductor is coupled with another terminal of said bi-directional semiconductor switch to define a fourth terminal therebetween, wherein said first and fourth input terminals of said four phase full-bridge rectifier are for respectively coupling with the first and second source terminals of the AC voltage source, wherein said third terminal is coupled with said second input terminal of said four phase full bridge rectifier, and said fourth terminal is coupled with third input terminal of said four phase full-bridge rectifier, wherein respective values of said capacitor and said inductor are set corresponding to a value of the DC load resistance to form said four phase AC voltage, and a phase angle of said bi-directional semiconductor switch is varied in accordance with a variation of the AC input voltage or a DC output load current.

17. A pseudo four phase full bridge rectifier circuit as claimed in claim 16, wherein a maximum DC output voltage is controlled to be equal to a maximum AC input voltage.

18. A pseudo four phase full bridge rectifier circuit as claimed in claim 16, wherein said bi-directional semiconductor switch is a triac.

19. A three phase full bridge rectifier circuit as claimed in claim 16, wherein the values of said inductor and said capacitance are set so as to deviate from an optimum inductance and capacitance.

20. A pseudo four phase full bridge rectifier circuit as claimed in claim 16, wherein the values of said inductor and said capacitance are set so as to deviate from an optimum inductance and capacitance.

21. A three phase full bridge rectifier circuit as claimed in claim 15, further comprising a cut off device to cut off at least one of said capacitor and said inductor during an output load idle condition.

22. A three phase full bridge rectifier circuit as claimed in claim 1, wherein said inductor is a choke coil.

23. A pseudo four phase full bridge rectifier circuit as claimed in claim 3, wherein said inductor is a choke coil.

24. A three phase full bridge rectifier circuit as claimed in claim 15, wherein said inductor is a choke coil.

25. A pseudo four phase full bridge rectifier circuit as claimed in claim 16, wherein said inductor is a choke coil.

* * * * *